US012693247B2

(12) United States Patent
Morihisa

(10) Patent No.: US 12,693,247 B2
(45) Date of Patent: Jul. 28, 2026

(54) X-RAY FLUORESCENCE ANALYZER

(71) Applicant: SHIMADZU CORPORATION, Kyoto (JP)

(72) Inventor: Yuji Morihisa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 253 days.

(21) Appl. No.: 18/623,832

(22) Filed: Apr. 1, 2024

(65) Prior Publication Data

US 2024/0328971 A1 Oct. 3, 2024

(30) Foreign Application Priority Data

Apr. 3, 2023 (JP) ................................. 2023-060090

(51) Int. Cl.
*G01N 23/223* (2006.01)
*G01N 1/42* (2006.01)
*G01N 23/2209* (2018.01)
(52) U.S. Cl.
CPC ............. *G01N 23/223* (2013.01); *G01N 1/42* (2013.01); *G01N 23/2209* (2018.02); *G01N 2223/30* (2013.01)
(58) Field of Classification Search
CPC ............. G01N 23/223; G01N 23/2209; G01N 23/2202; G01N 2223/30; G01N 2223/076; G01N 2223/1016
See application file for complete search history.

(56) References Cited

U.S. PATENT DOCUMENTS

| | | | |
|---|---|---|---|
| 2016/0116424 A1 | 4/2016 | Furukawa et al. | |
| 2021/0270757 A1* | 9/2021 | Morihisa | G01N 23/223 |
| 2024/0361263 A1* | 10/2024 | Nagoshi | G01M 3/3272 |

FOREIGN PATENT DOCUMENTS

| | | |
|---|---|---|
| JP | H07-050148 | 2/1995 |
| WO | 2014/192173 A1 | 12/2014 |

OTHER PUBLICATIONS

Flex Service Co., Ltd. Heating/Cooling Stagehttps://www.flex-service.com/products/coolstage.html, Retrieved on Nov. 21, 2022.

(Continued)

*Primary Examiner* — Casey Bryant
(74) *Attorney, Agent, or Firm* — Muir Patent Law, PLLC

(57) ABSTRACT

The X-ray fluorescence analyzer is equipped with a sample stage, a first housing, an X-ray tube, a detector, and a vacuum adjustment mechanism. The sample stage is configured to place a sample thereon. The first housing is mounted on a first face of the sample stage, the sample being placed on the first face, the first housing forming a sample chamber together with the sample stage. The detector is configured to detect fluorescent X-rays emitted from the sample when the sample in the sample chamber is irradiated with primary X-rays emitted from the X-ray tube. The vacuum adjustment mechanism sets the degree of vacuum in the sample chamber. In a case where the sample is liquid, the vacuum adjustment mechanism sets the degree of vacuum in the sample chamber during the analysis of the sample to be lower than in a case where the sample is a solid sample.

15 Claims, 14 Drawing Sheets

(56) References Cited

OTHER PUBLICATIONS

Jeol low vacuum liquid capsulehttps://www.jeol.co.jp/download_
catalogues.html#xrf, Searched on Nov. 21, 2022.
"Talk about measurement methods_ Let's try using SEM! 'Using
SEM'", https://www.tatourui.com/trivia/trivia_vol. 23, Nov. 24, 2017.

* cited by examiner

Transmittance at a path length of 10 mm with respect to characteristic X-rays of light elements

| Atmosphere \ Characteristic X-ray [KeV] | F-Kα 0.687 | Na-Kα 1.041 | Mg-Kα 1.303 | Al-Kα 1.560 | Si-Kα 1.840 | P-Kα 2.013 | S-Kα 2.307 | Cl-Kα 2.621 |
|---|---|---|---|---|---|---|---|---|
| He 101325Pa(1atm) | 0.9685 (100%) | 0.9914 (100%) | 0.9958 (100%) | 0.9976 (100%) | 0.9986 (100%) | 0.999 (100%) | 0.9994 (100%) | 0.9996 (100%) |
| DryAir 50Pa | 0.9944 (102.68%) | 0.9981 (100.68%) | 0.9990 (100.32%) | 0.9994 (100.18%) | 0.9994 (100.08%) | 0.9996 (100.06%) | 0.9998 (100.04%) | 0.9999 (100.03%) |
| DryAir 667Pa | 0.9268 (95.70%) | 0.9746 (98.30%) | 0.9901 (99.40%) | 0.9932 (99.60%) | 0.9947 (99.60%) | 0.9959 (99.70%) | 0.9972 (99.80%) | 0.9981 (99.90%) |
| DryAir 1200Pa | 0.8469 (87.44%) | 0.9550 (96.33%) | 0.9753 (97.94%) | 0.9850 (98.74%) | 0.9906 (99.19%) | 0.9927 (99.37%) | 0.9951 (99.57%) | 0.9966 (99.70%) |
| DryAir 101325Pa(1atm) | $4.23 \times 10^{-6}$ (0.00%) | 0.02054 (2.07%) | 0.12121 (12.17%) | 0.27882 (27.95%) | 0.44899 (44.96%) | 0.53811 (53.86%) | 0.65813 (65.85%) | 0.74938 (74.97%) |

※ Value in ( ) is a value when a helium atmosphere transmittance is 100%

| Triple Point | | |
|---|---|---|
| Type of substance | Temperature [°C] | Pressure [Pa] |
| Water | 0.01 | 611.657 |
| Ethanol | −123 | $4.3 \times 10^{-4}$ |
| Methanol | −97.7 | 0.186 |
| Ether | −169.16 | 122 |

Image of Phase Diagram of Methanol

FIG. 10

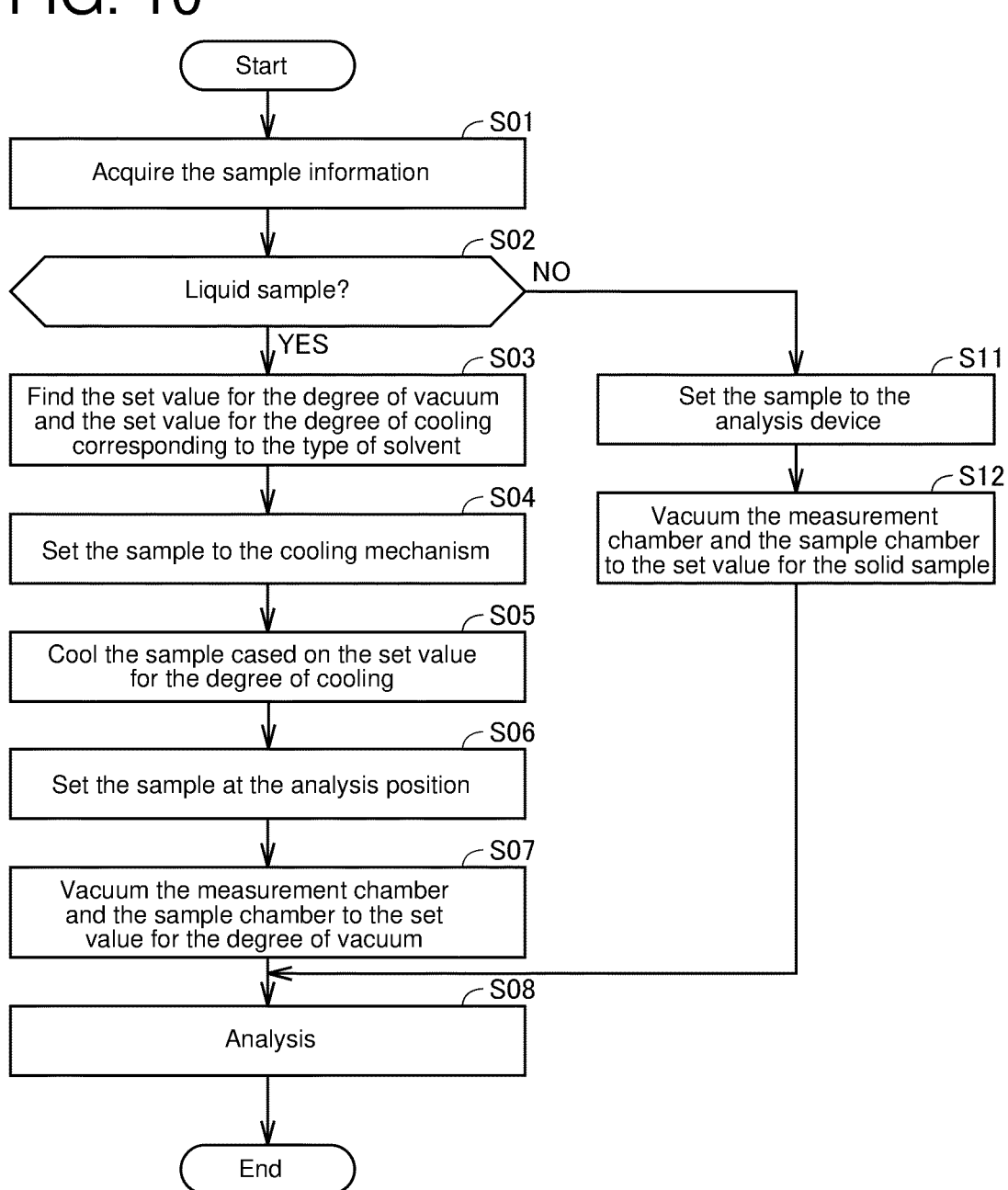

Start

⌐ S01

Acquire the sample information

⌐ S02

Liquid sample?                          NO

YES                          ⌐ S03                    ⌐ S11

Find the set value for the degree of vacuum and the set value for the degree of cooling corresponding to the type of solvent Set the sample to the analysis device

⌐ S04                    ⌐ S12

Set the sample to the cooling mechanism

Vacuum the measurement chamber and the sample chamber to the set value for the solid sample

⌐ S05

Cool the sample cased on the set value for the degree of cooling

⌐ S06

Set the sample at the analysis position

⌐ S07

Vacuum the measurement chamber and the sample chamber to the set value for the degree of vacuum

⌐ S08

Analysis

End

X-RAY FLUORESCENCE ANALYZER

CROSS-REFERENCE TO RELATED APPLICATIONS

This application claims priority under 35 U.S.C. § 119 to Japanese Patent Application No. 2023-060090 filed on Apr. 3, 2023, the entire disclosure of which is incorporated herein by reference in its entirety.

BACKGROUND OF THE INVENTION

Field of the Invention

The present disclosure relates to an X-ray analyzer.

Description of the Related Art

The following description sets forth the inventor's knowledge of the related art and problems therein and should not be construed as an admission of knowledge in the prior art.

In an energy dispersive X-ray fluorescence analyzer (EDX: Energy Dispersive X-ray Spectrometry), sample analysis is performed by irradiating the sample with primary X-rays emitted from an X-ray source and analyzing fluorescence X-rays generated from the sample.

It is known that X-rays attenuate according to the type and the density of the gas through which X-rays travel. In general, gases with larger atomic numbers and higher densities tend to attenuate X-rays more easily and have lower transmission rates. In particular, it is known that the characteristic X-rays of light elements significantly attenuate even in a 1 atmosphere. Therefore, in the case of analyzing light elements, the analysis is performed in a vacuum atmosphere by reducing the atmospheric pressure in the analyzer, or in a helium atmosphere by replacing the atmosphere in the analyzer with helium having a lower atomic number. International Publication WO 2014/192173 discloses an X-ray fluorescence analyzer in which the inside of the analysis chamber is replaced with a helium gas that absorbs X-rays less than the atmosphere when light elements are included in the analysis target.

However, the analysis method performed in a helium atmosphere is problematic because of the rising global demand for helium and stagnant transportation, which is serious in price escalation and supply shortage of helium. The method in which the atmosphere inside the analyzer is depressurized also has such a problem that in a case where the sample is liquid, the liquid sample will vaporize when the atmospheric pressure around the liquid sample is reduced to be lower than the vapor pressure of the liquid sample.

SUMMARY OF THE INVENTION

The present disclosure has been made in order to solve such problems. The purpose of the present disclosure is to enable a light element analysis with sufficient intensity in an X-ray fluorescence analyzer without using helium and without vaporizing a liquid sample.

A first aspect of the present disclosure relates to an X-ray fluorescence analyzer. The X-ray fluorescence analyzer is an energy dispersive X-ray fluorescence analyzer for analyzing a sample. The energy dispersive X-ray fluorescence analyzer is provided with a sample stage, a first housing, an X-ray tube, a detector, and a vacuum adjustment mechanism. The sample stage is configured to place the sample thereon. The first housing is mounted on a first face of the sample stage, the sample being placed on the first face, the first housing forming a sample chamber together with the sample stage. The detector is configured to detect fluorescent X-rays emitted from the sample when the sample in the sample chamber is irradiated with primary X-rays emitted from the X-ray tube. The vacuum adjustment mechanism is configured to set a degree of vacuum in the sample chamber. In a case where the sample is liquid, the vacuum adjustment mechanism sets the degree of vacuum in the sample chamber during the analysis of the sample to be lower than in a case where the sample is solid.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

Some preferred embodiments of the present disclosure are shown by way of example, and not limitation, in the accompanying figures.

FIG. 6 is a table of the transmittance of the characteristic X-rays for light elements.

FIG. 10 is a flowchart describing the processing of setting the degree of vacuum and the degree of cooling according to an embodiment.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those skilled in the art based on these illustrated embodiments.

Hereinafter, some embodiments of the present disclosure will be described in detail with reference to the attached drawings. Note that the same or equivalent portion in the figures is assigned by the same reference symbol, and the description will not be repeated.

1. Configuration of X-Ray Fluorescence Analyzer

Figure 1:
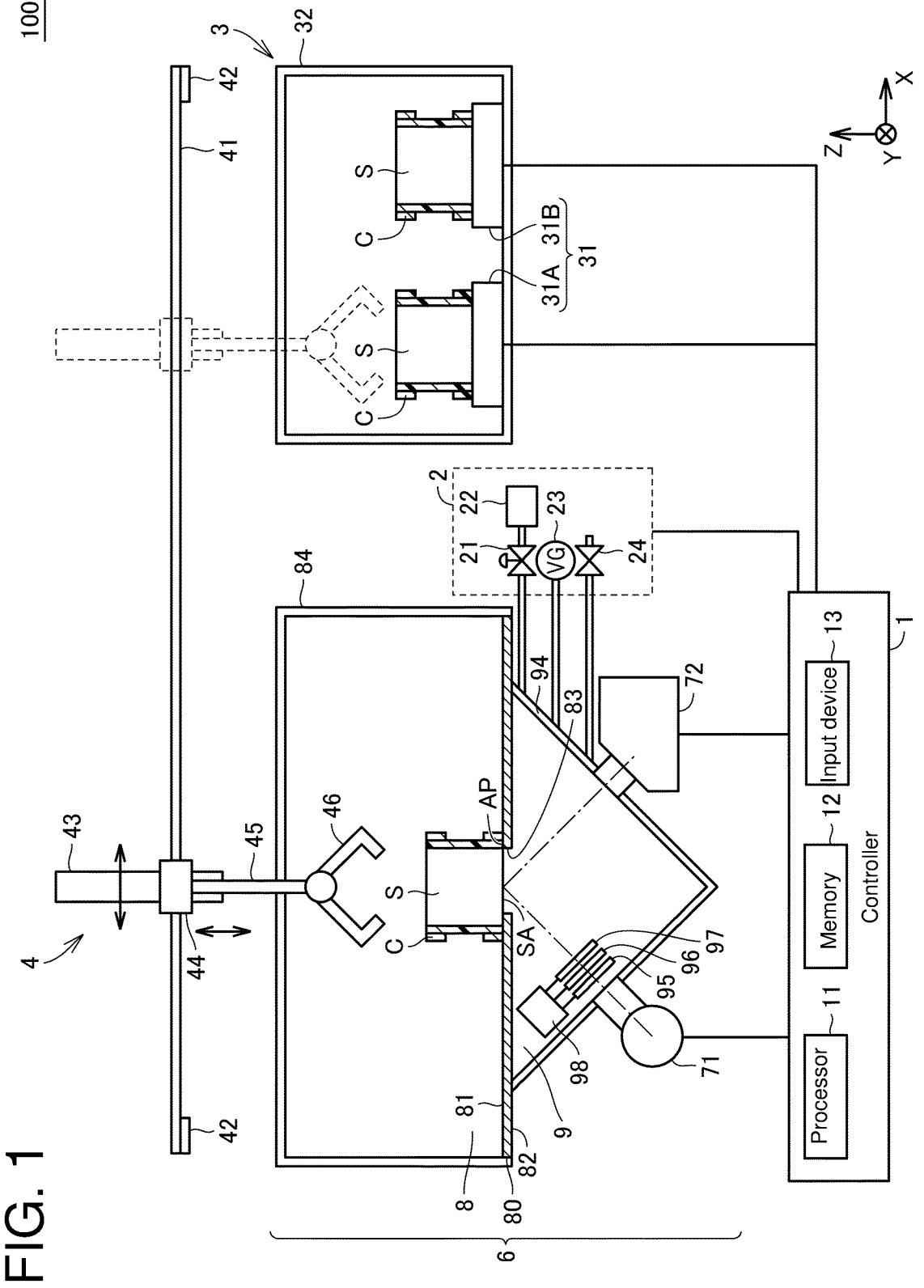
FIG. 1 is a schematic diagram showing one example of a configuration of an analyzer according to an embodiment.

FIG. 1 is a schematic diagram showing a configuration of an analyzer 100 according to an embodiment of the present disclosure. Referring to FIG. 1, the analyzer 100 is an X-ray fluorescence analyzer. In one example, the analyzer 100 is an EDX. The analyzer 100 includes a controller 1, a vacuum adjustment mechanism 2, a cooling mechanism 3, a moving mechanism 4, and an apparatus main body 6.

The apparatus main body 6 includes a housing 84, a housing 94, and a sample stand 80. The housing 84 is installed on the first face 81 of the sample table 80. The housing 84 and the sample stage 80 form the sample chamber 8. The housing 94 is installed on the second face 82 of the sample table 80. The housing 94 and the sample stage 80 form the measurement chamber 9. The sample chamber 8 and the measurement chamber 9 are hermetically enclosed by the housing 84 and the housing 94.

Hereafter, in FIG. 1, the direction perpendicular to sample stage 80 is defined as a Z-axis direction, and the plane parallel to the plane of the sample stage 80 is defined as an X-Y plane. In one example, the analyzer 100 is used in a state in which it is installed with the Z-axis generally parallel to the direction of gravity. In this case, the first face 81 of the sample stage 80 is a so-called "sample stage top face," and the second face 82 of the sample stage 80 is a so-called "sample stage bottom face."

The sample stage opening 83 is formed in the sample stage 80. At the time of analyzing the sample S, the sample S is placed on the sample stage 80 so as to cover the sample stage opening 83. With this, the sample lower surface SA, which is the lower surface of the sample S, is exposed to the measurement chamber 9 through the sample stage opening 83. Hereafter, the position where the sample S is placed during the analysis is also referred to as the "analysis position" AP.

In one example, the sample S is a powder sample or a liquid sample and is held in a container C for holding the sample S. In this case, during the analysis of the sample S, the sample S accommodated in the container C is placed on the first face 81 so as to cover the sample stage opening 83. However, the sample S may be a solid sample larger than powder, in which case it does not have to be accommodated in the container C.

In this specification, the "phase of a sample" indicates whether the sample is in a liquid phase or a solid phase, i.e., whether it is a liquid sample or a solid sample. In this document, unless otherwise indicated, a liquid sample refers to a sample that is liquid at room temperature and under atmospheric pressure. Further, a solid sample refers to a sample that is solid at room temperature and under atmospheric pressure.

Further, the term "type of sample" indicates the type and the mixing ratio of a substance constituting a sample. Specifically, for example, the type of a liquid sample is defined by the name and/or the chemical formula of the substance that is the solute, the name and/or the chemical formula of the substance that is the solvent, and the concentration of the solute. Further, the type of solvent of a liquid sample is defined by the name and/or the chemical formula of the substance that is the solvent, and can be exemplified by water, alcohol, or acetone. A liquid sample may contain fats and oils. In this case, the components constituting the fat or oil itself (e.g., sulfur in mineral oil) may be the analysis target, or the additives added to the fat or oil using the fat or oil as a solvent may be the analysis target.

Note that in an EDX, analysis results for a plurality of elements in a sample are usually acquired at the same time. Elements in the sample to be analyzed may or may not contain light elements. In this specification, elements in which the attenuation of characteristic X-rays in an atmospheric state under atmospheric pressure (hereinafter referred to as "atmospheric atmosphere") are large enough to affect the analysis results is referred to as "light elements." Further, elements heavier than light elements (in other words, elements with atomic numbers larger than those of light elements) are referred to as "heavier elements." When light elements are analysis targets, analysis results for "heavier elements" are often acquired at the same time. Therefore, there are two types of analyses: "an analysis including a light element analysis" and "an analysis not including a light element analysis."

In other words, an "analysis including a light element analysis" is an "analysis including light elements as analysis targets." In other words, "an analysis not including a light element analysis" is an "analysis in which "light elements are not included in the analysis target, and only "heavier elements" are analyzed." "An analysis including a light element analysis" means, for example, an analysis in which at least one of F, Na, Mg, Al, Si, P, S, and Cl is included as an analysis target element. An "analysis not including a light element analysis" is, for example, an analysis in which the analysis target element does not include any of F, Na, Mg, Al, Si, P, S, and Cl, but includes at least one of Ga, As, Cu, and Ag.

The container C includes, for example, a tubular resin cylindrical member and a thin resin film. The opening at the bottom end of the cylindrical member is closed by being covered with the film. The film is fixed to the container C using a fixing member, such as a ring. The film is made of a resin composed of only C and H or only C, H, and O, such as, e.g., polypropylene and polyethylene terephthalate. These elements are outside (elements lighter than fluorine) the analysis target range of an EDX, so the film itself does not emit fluorescent X-rays to be analyzed.

Further, the film is thin enough to allow sufficient penetration of primary X-rays and fluorescent X-rays for both the "analysis including a light element analysis" and the "analysis not including a light element analysis." Note that the film is thin enough, so that the first face 81 of the sample stage 80 and the sample lower surface SA have approximately the same height in the Z-axis direction. Therefore, the film is not illustrated in FIG. 1 and following figures.

The measurement chamber 9 is provided with an X-ray tube 71, a detector 72, a collimator 95, a shutter 96, a filter 97, and a drive mechanism 98.

The X-ray tube 71 and the detector 72 are installed on the wall of the measurement chamber 9. The X-ray tube 71 includes a filament that emits thermal electrons and a target that converts the thermal electrons into given primary X-rays and emits them. The primary X-rays emitted from the X-ray tube 71 are emitted to the sample S through the sample stage opening 83. Secondary X-rays (fluorescent X-rays) generated from the sample S are incident on the detector 72, and the detector 72 measures the energy and the quantity of fluorescent X-rays.

More specifically, the amount of X-rays is generally expressed by the number of X-ray photons per unit of time. The quantity of X-rays is also referred to as the intensity of X-rays. The energy of X-rays is generally expressed by the wavelength of the X-rays. The detection result of the detector 72 is typically expressed as a fluorescent X-ray spectrum showing the relation between the energy and the quantity of the detected fluorescent X-rays.

The collimator 95, the shutter 96, and the filter 97 are arranged in the optical path of primary X-rays from the X-ray tube 71 to the sample S.

The collimator 95 has a circular opening in the center to narrow the emission range of the primary X-rays emitted from the X-ray tube 71. The collimator 95 is made of an X-ray absorbing material, such as, e.g., lead and brass. In one example, the collimator 95 is composed, for example, of a plurality of collimators with mutually different opening diameters, and a collimator selected according to the purpose is inserted on the primary X-ray beam line by the drive mechanism 98. The primary X-rays passing through the collimator 95 pass through the filter 97 and are incident on the analysis plane of the sample S when the shutter 96 is open.

The shutter 96 is made of an X-ray absorbing material such as lead, which can be inserted into the primary X-ray path to shield the primary X-rays when it is necessary to shield the primary X-rays.

The filter 97 is a primary X-ray filter formed of a purpose-selected metal foil that attenuates the background components of the primary X-rays emitted from the X-ray tube 71 to improve the S/N ratio of the required characteristic X-rays. In one example, the filter 97 is composed of a plurality of filters made of mutually different metals, and the filter selected in accordance with the purpose is inserted into the optical path of the primary X-rays by the drive mechanism 98. The primary X-rays that have passed through the filter 97 are incident on the sample S.

The vacuum adjustment mechanism 2 sets the degree of vacuum in the sample chamber 8. Note that the "degree of vacuum" is a degree of vacuum expressed by the pressure of the residual gas with respect to the vacuum state created by a vacuum pump or similar device. In this specification, the degree of vacuum of about 50 Pa is described as a first degree of vacuum, and the degree of vacuum equal to or below about 667 Pa is described as a second degree of vacuum. Further, in this specification, in the case where it is simply stated as the atmosphere of the first degree of vacuum and the atmosphere of the second degree of vacuum, it refers to the atmosphere in which the atmosphere is vacuumed to the first degree of vacuum and the atmosphere in which the atmosphere is vacuumed to the second degree of vacuum, respectively.

Further, in this specification, "setting the degree of vacuum" includes adjusting the degree of vacuum to the same level as a predetermined set value. Note that the "set value" is not limited to a single predetermined value but may be a range with a predetermined upper limit and a predetermined lower limit. The "set value" may be defined, for example, as one predetermined value with a predetermined error range.

In one example, the vacuum adjustment mechanism 2 performs vacuuming of the sample chamber 8 and the measurement chamber 9 so that the degree of vacuum in the sample chamber 8 and the degree of vacuum in the measurement chamber 9 become equal during the analysis of the sample.

In the example shown in FIG. 1, the vacuum adjustment mechanism 2 includes a conductance valve 21, a pump 22, a vacuum gauge 23, and a valve 24.

The pump 22 evacuates the measurement chamber 9 and the sample chamber 8, the sample chamber 8 being connected to the measurement chamber 9 via the sample stage opening 83. In one example, the pump 22 is a rotary pump capable of vacuuming to the degree of vacuum necessary to guarantee the intensity of characteristic X-rays of light elements (about 50 Pa, see FIG. 6) and is available in a wide variety of types and relatively inexpensive.

The conductance valve 21 is a variable valve capable of changing the open/close timing and amount. The opening and closing timing and the opening and closing amount of the conductance valve 21 are controlled by the controller 1. The conductance valve 21 sets the vacuum exhaust conductance, which is arranged in the piping of the vacuum exhaust system.

The vacuum gauge 23 measures the degree of vacuum in the measurement chamber 9 and can be fed back to set the degree of vacuum by the conductance valve 21, the pump 22, and the valve 24. With this, it is possible to accurately set the degree of vacuum in the measurement chamber 9 and the sample chamber 8.

The valve 24 is a leak valve used to allow air to flow into the measurement chamber 9, reduce the degree of vacuum in the measurement chamber 9 and the sample chamber 8, and make the previously vacuum atmosphere of the measurement chamber 9 and the sample chamber 8 into an atmospheric atmosphere. In one example, the valve 24 is a valve that is not adjustable in the opening and closing degree and switches between a fully opened position and a fully closed position. However, the valve 24 may be a variable valve capable of manually or automatically adjusting the degree of opening and closing.

With the above-described configuration, it is possible to set the degree of vacuum in the measurement chamber 9 and the sample chamber 8 and create an atmosphere with three or more steps of the degree of vacuum or a stepless degree of vacuum together with the atmospheric atmosphere. In other words, the vacuum adjustment mechanism 2 can adjust the degree of vacuum in the sample chamber 8 during the analysis of the sample S in three or more steps, or steplessly. With this, it is possible to set the degree of vacuum to an appropriate level based on the phase and the type of the sample. The above-described three or more steps include, for example, an atmospheric pressure, the first degree of vacuum, and the second degree of vacuum.

More precisely, the controller 1 sets the atmosphere of the measurement chamber 9 and that of the sample chamber 8 based on whether the analysis includes a light element analysis, and the type of the sample in the case where the analysis includes a light element analysis. For example, in the case of the "analysis without light element analysis," the atmosphere is set to atmospheric atmosphere regardless of the type of the sample, and in the case of the "analysis with light element analysis" for a solid sample, the atmosphere is set to the first degree of vacuum, or in the case of an analysis with light element analysis for a liquid sample, the atmosphere is set to the second degree of vacuum (the details will be described later). With this, it is possible to perform a light element analysis with sufficient intensity without using helium or vaporizing the liquid sample.

According to the vacuum adjustment mechanism 2 as illustrated in FIG. 1, it is possible to vacuum the measurement chamber 9 and at the same time to vacuum the sample chamber 8 through the sample stage opening 83 and the gap between the sample stage 80 and the sample S. With this, it is possible to reduce the degree of vacuum in the sample chamber 8 and the degree of vacuum in the measurement chamber 9 to the same level. This prevents the film of the container C from bending downward due to the difference in the degree of vacuum between the two chambers, causing damage to the film or affecting the signal intensity due to the bending or the damage.

In one example 2, the vacuum adjustment mechanism 2 including the conductance valve 21, the valve 24, and the pump 22 is set and controlled by the controller 1. However, at least a part of the setting and the control of the vacuum adjustment mechanism 2 may be performed manually by the user.

The cooling mechanism 3 is a mechanism for cooling the sample S before or during the analysis in order to keep the temperature of the sample S within a desired temperature range during the analysis. The desired temperature range is, for example, the temperature range in which the sample will not vaporize at the atmospheric pressure in the sample chamber 8. In one example, the cooling mechanism 3 includes a cooling unit 31 and a housing 32. The housing 32 accommodates the sample S and the cooling unit. The cooling unit 31 is composed of, for example, Peltier elements 31A and 31B, each on which samples of different types S are placed. And the Peltier elements 31A and 31B are each set to a predetermined temperature corresponding to the type of the placed sample S. This allows the sample S to be cooled to an appropriate temperature depending on the type of the sample S. The cooling mechanism 3 may include a temperature measuring element such as a thermocouple.

In this case, the controller 1, for example, acquires the measurement temperature from the temperature measuring element and performs a feedback control by operating the Peltier elements 31A and 31B based on the measured temperature. The cooling mechanism 3 is not limited to the above example and may be, for example, a refrigerator that cools the interior of the housing 32 using convection currents. In this case, the cooling unit 31 is, for example, a cooling tube. One example of the cooling mechanism 3 is a separate refrigerator owned by the user, which is not part of the X-ray analyzer. For example, a refrigerator dedicated to storing samples S as analysis targets may be used, or a refrigerator with a general ice greenhouse or a partial chamber may be used.

Figure 2:
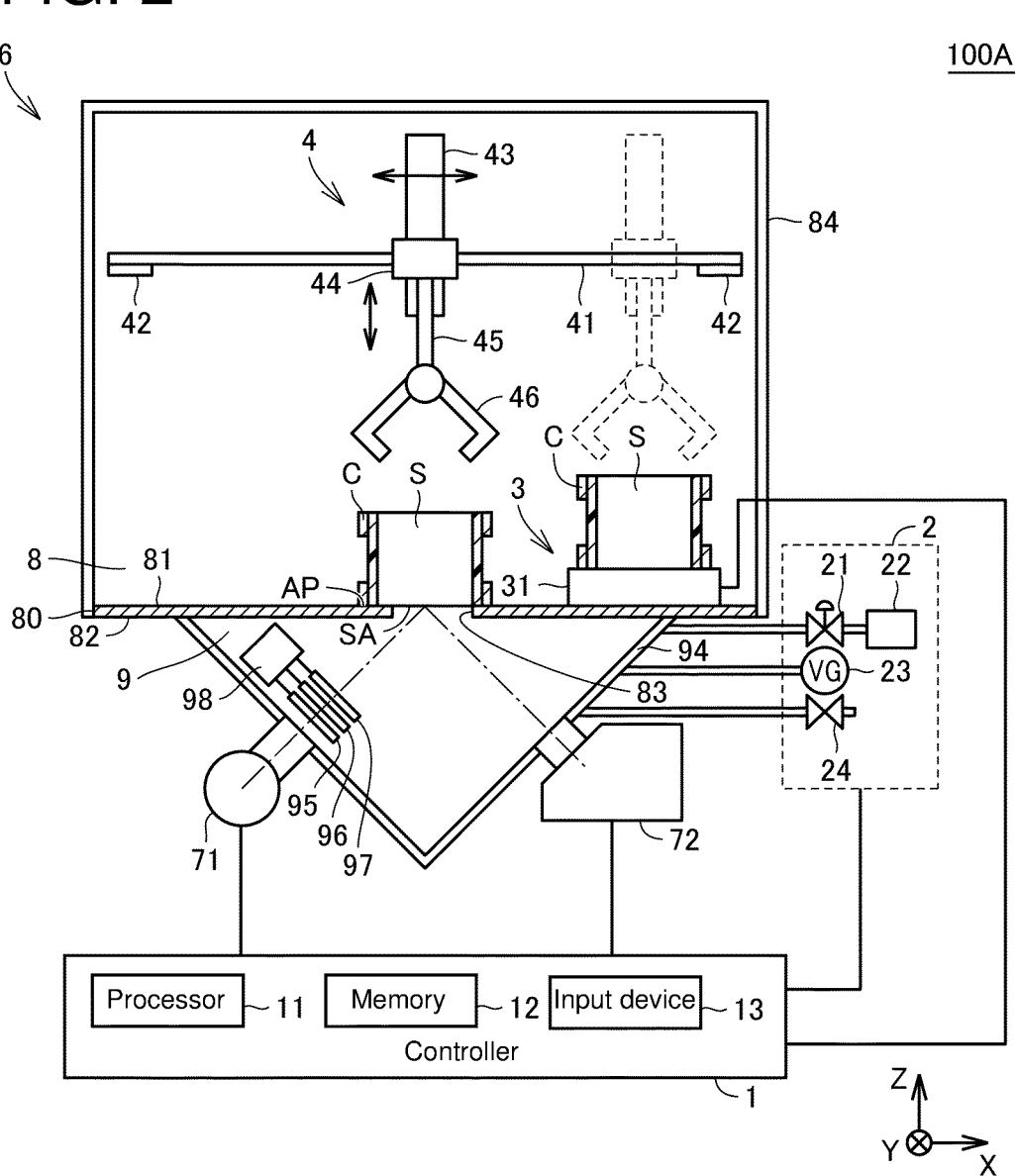
FIG. 2 is a schematic diagram showing one example of a configuration of an analyzer according to an embodiment.

The cooling mechanism 3 may be located, for example, inside the sample chamber 8 (FIG. 2). In the case where the cooling mechanism 3 is located at a location away from the analysis position AP, as shown in FIG. 1 to FIG. 2, the controller 1 moves the sample S, which has been cooled by the cooling mechanism 3 before the analysis, to the analysis position AP by the moving mechanism 4 and then analyzes the sample S.

Figure 3:
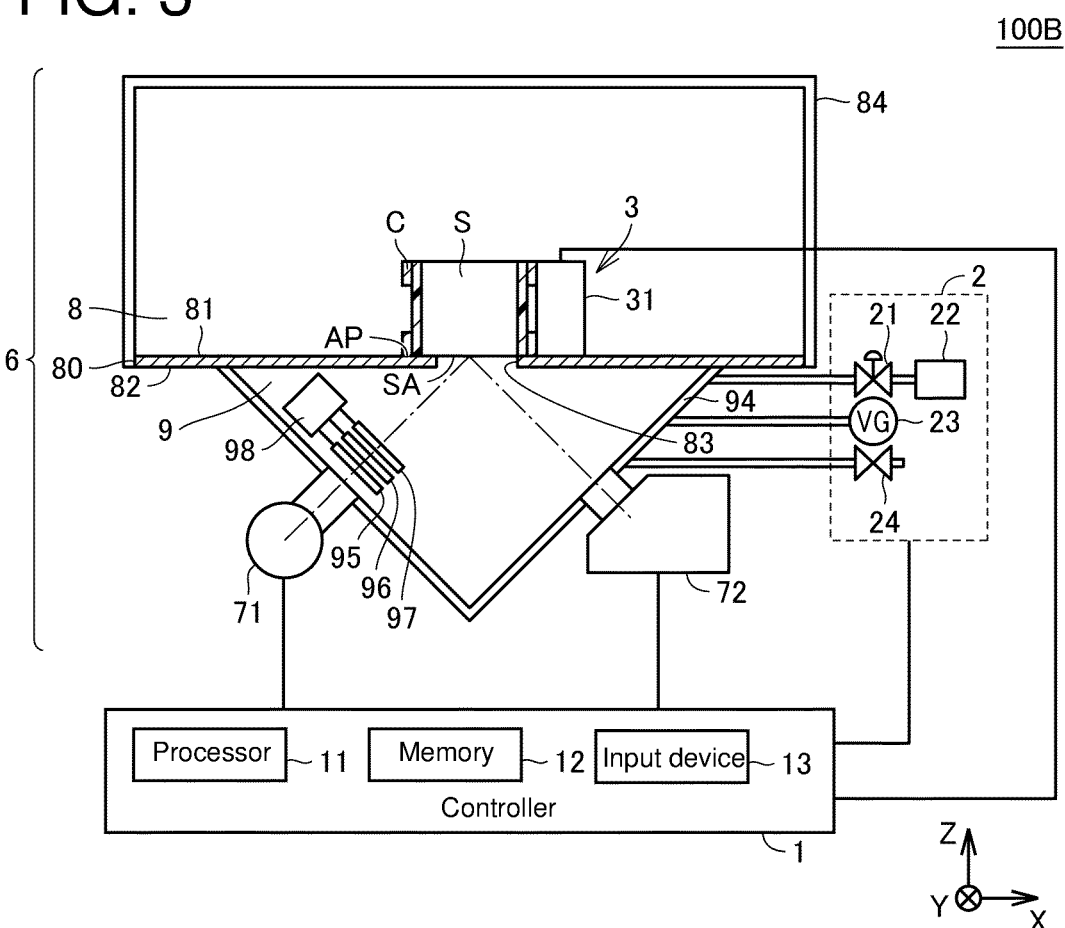
FIG. 3 is a schematic diagram showing one example of a configuration of an analyzer according to an embodiment.

Further, the cooling mechanism 3 may be provided, for example, at a location adjacent to the analysis position AP to cool the sample S during the analysis (see FIG. 3). With this, it is possible to keep the sample in the above-described desired temperature range during the analysis.

Note that in the case where the sample S does not require cooling during and/or before the analysis, the cooling mechanism 3 is not used for the sample S. The case in which the sample S does not require cooling during and/or prior to the analysis includes, for example, the case of "analysis not including a light element analysis" and the case of "analysis including a light element analysis" for a liquid sample that does not vaporize when placed at room temperature and at the first or second degree of vacuum.

As shown in FIG. 1 to FIG. 2, when the cooling mechanism 3 is positioned at a location away from the analysis position AP, the moving mechanism 4 moves the sample S cooled by the cooling mechanism 3 to the analysis position AP. The moving mechanism 4 includes an X-axis rail 41, Y-axis rails 42, a Z-axis rail 43, a moving body 44, an arm 45, and a gripper 46.

The sample S is gripped by the gripper 46 and moved as the gripper 46 moves. The griper 46 is provided at the tip end (lower end) of the arm 45. The gripper 46 is movable in the X-axis direction, the Y-axis direction, and the Z-axis direction. The gripper 46 moves along the X-axis direction with the moving body 44 as the moving body 44 moves along the X-axis rail 41. The gripper 46 moves along the Y-axis direction with the X-axis rail 41 as the X-axis rail 41 moves along the Y-axis direction together with the X-axis rail 41. The gripper 46 moves along the Z-axis direction together with the arm 45 as the arm 45 moves along the Z-axis rail 43 in the Z-axis direction. With this, the gripper 46 grips the sample S and moves the sample S from the cooling mechanism 3 to the analysis position AP.

However, it may be performed manually by the user to move the sample S, which has been cooled by the cooling mechanism 3, to the analysis position AP. Further, as shown in FIG. 3, in the case where the cooling mechanism 3 is provided at a position adjacent to the analysis position AP to cool the sample S during the analysis, the moving mechanism 4 may not be provided.

The controller 1 includes a processor 11, a memory 12, and an input device 13. As the controller 1, for example, a personal computer can be used.

The processor 11 comprises, for example, a CPU (Central Processing Unit).

The memory 12 is realized by a storage device, such as, e.g., a ROM (Read Only Memory), a RAM (Random Access Memory), and an HDD (Hard Disk Drive). In one example, the memory 12 stores the set values for the degree of vacuum in the sample chamber 8 and the degree of cooling of the liquid sample, corresponding to the type of the solvent of the liquid sample, wherein the solvent is liquid.

The input device 13 includes, for example, at least one of a keyboard, a mouse, a touch panel, buttons, and a knob. The input device 13 is configured to allow inputs of the sample information, the set value for the degree of vacuum in the sample chamber 8, and/or the degree of cooling of the liquid sample.

The controller 1 acquires the fluorescent X-ray spectrum detected by the detector 72 during the measurement. The controller 1 performs a quantitative analysis of each element based on the spectrum of the fluorescent X-rays. In the X-ray fluorescence spectrum, an X-ray fluorescence peak appears at the energy position unique to each element. By examining the peak position and the peak intensity of the X-ray fluorescence spectrum, the energy and the quantity of the fluorescence X-ray can be determined, and therefore, the type and the quantity of the element contained in the sample S can be identified.

The controller 1 controls the vacuum adjustment mechanism 2, the cooling mechanism 3, the moving mechanism 4, and the main body 6. With this, the controller 1 can set the degree of vacuum in the sample chamber 8 and the degree of cooling of the sample S according to the phase and the type of the sample S. Further, it is possible to analyze the sample S under the set condition (the details will be described later).

2. Conventional X-ray Fluorescence Analysis

In the X-ray fluorescence analysis, it is known that the attenuation of characteristic X-rays for light elements is large in an atmospheric atmosphere at 1 atmospheric pressure. Specifically, in a 10 mm optical path length, the transmittance of the Al—Kα ray (1.56 keV) is 28%, and the F—Kα ray (0.69 keV) attenuates to a percentage equal to or less than five decimal places. For this reason, for light elements, an analysis method is known in which the atmospheric atmosphere of 1 atm is reduced to a vacuum atmosphere in order to suppress the attenuation of characteristic X-rays.

However, when the air pressure of the vacuum atmosphere is lower than the vapor pressure of the liquid sample, the liquid sample vaporizes and diffuses into the vacuum atmosphere. As a result, the solvent, or a part of the solute, may adhere to the inside of the device. With this, there is concern that this may cause problems in the analyzer or the analysis by the analyzer. Further, in the event that the sample in the container is significantly reduced or completely gone due to the above vaporization and diffusion, there is a concern that problems may arise in the analysis of the sample.

Therefore, in order to suppress the vaporization of the liquid sample, there is a method in which the analysis is performed in a helium atmosphere having an atomic number smaller than that of the atmosphere ($N_2$ 80%+$O_2$ 20%), instead of a vacuum atmosphere for light elements in the liquid sample. Note that in this specification, the "helium atmosphere" refers to the state of being in helium at atmospheric pressure (1 atm), unless otherwise indicated. Relatedly, Patent Document 1 discloses an X-ray fluorescence analyzer that replaces the inside of the analysis chamber with a helium gas absorbing X-rays less than air in the case where light elements are contained in the analysis target.

However, the price of helium gas has increased more than threefold in the last decade, and the import amount has decreased by 40%, due to the increment amount of demand for helium in various countries, especially in Asia, and stagnant transportation. As described above, the price increase and the supply shortage of helium are serious.

In light of the above-described circumstances, in the X-ray fluorescence analyzer of this embodiment, in the case where the sample is liquid, the atmosphere around the sample is set so that the degree of vacuum is lower than when the sample is solid. With this, for a liquid sample, it is possible to analyze light elements without using helium and without vaporizing the liquid sample.

3. Setting Degree of Vacuum in Sample Chamber and Degree of Cooling of Sample

3-1. Setting Degree of Vacuum and Degree of Cooling According to Phase and Type of Sample Next, the settings of the degree of vacuum and the degree of cooling of the sample in the sample chamber 8 in the analyzer 100 according to this embodiment will be described with reference to FIG. 4.

Figure 4:
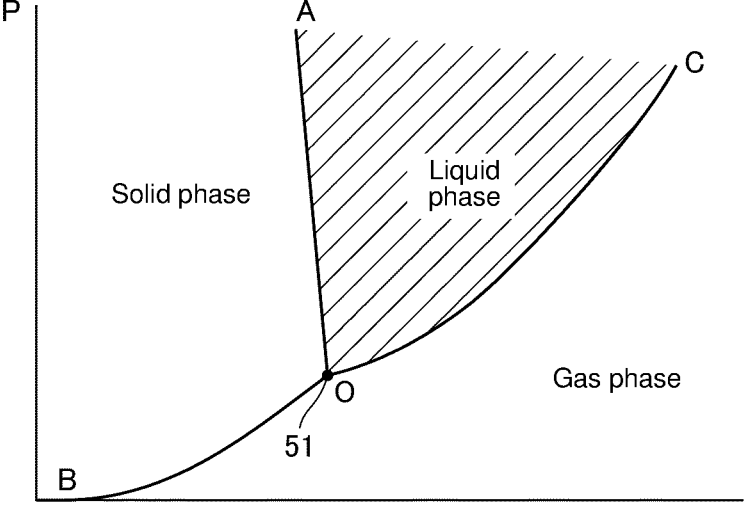
FIG. 4 is a diagram describing the settings of the degree of vacuum in a sample chamber and the degree of cooling of a sample.

FIG. 4 is a diagram showing a phase change of a substance. The horizontal axis indicates the temperature of the substance. The vertical axis indicates the atmospheric pressure around the substance. The line A shows the solid-liquid equilibrium line (melting curve). The line B shows the vapor-solid equilibrium line (sublimation pressure curve). The line C shows the vapor-liquid equilibrium line (vapor pressure curve). The point 51 indicates the triple point.

When the sample is a liquid sample that is liquid at room temperature and under atmospheric pressure, the analyzer 100 sets the degree of vacuum and the degree of cooling so that the liquid sample does not vaporize, i.e., does not transit from the liquid phase to the gas phase. In other words, the analyzer 100 sets the temperature of the liquid sample and the air pressure in the sample chamber to be within a range of the temperature and the air pressure corresponding to the liquid phase indicated by the hatching in FIG. 4.

More specifically, since the temperature or the degree of vacuum at which a phase change of a substance occurs differs depending on the type of substance, the analyzer 100 sets the degree of vacuum and the degree of cooling to be appropriate for the type of the sample. In general, the vaporization of a liquid sample refers to a state in which the solvent in the liquid sample evaporates. Therefore, in general, the analyzer 100 sets the degree of vacuum and the degree of cooling to be appropriate for the type of solvent. With this, it is possible to analyze a liquid sample in a state in which the solvent does not evaporate. However, in the case where the type and/or the quantity of the solute affects the vapor-liquid equilibrium line of the sample, the analyzer 100 may set the degree of vacuum and the degree of cooling appropriately, also considering the type and/or the quantity of the solute.

On the other hand, a sample that is solid at room temperature and under atmospheric pressure does not basically vaporize when placed in a vacuum atmosphere at room temperature. Therefore, the analyzer 100 sets the sample chamber 8 to an atmosphere of the first degree of vacuum without adjusting the temperature of the sample in analyzing a solid sample.

As described above, when the sample is liquid, the analyzer 100 sets the degree of vacuum in the sample chamber 8 during the analysis of the sample so that the degree of vacuum becomes lower than that when the sample is solid.

3-2. Set Value for Degree of Vacuum in Measurement Chamber

As described above, the transmittance of X-rays depends on the type and the density of the gas through which the X-rays transmit. Therefore, in the analyzer 100, the controller 1 preferably sets the degree of vacuum in the measurement chamber 9 within a range in which the transmittance of the characteristic X-rays to be analyzed is sufficiently strong.

Figure 5:
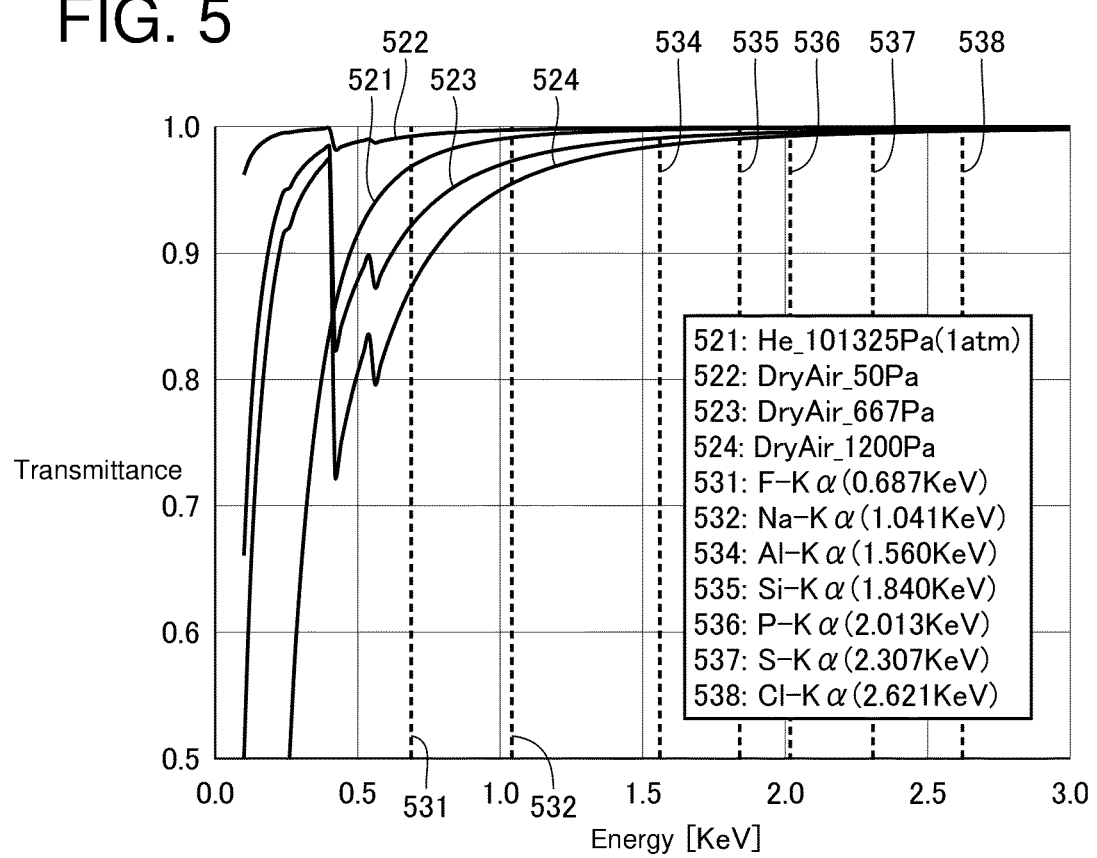
FIG. 5 is a graph of the transmittance of characteristic X-rays for light elements.

FIG. 5 is a graph of the transmittance of characteristic X-rays for light elements with respect to the optical path length of 10 mm. 10 mm is the approximate value of the distance from the analysis position AP to the detector window of the detector 72. The values shown in FIG. 5 and FIG. 6, which will be described later, correspond roughly to how much of the fluorescent X-rays for each light element generated by the sample attenuate before entering the detector window, and how much reaches the detector. The horizontal axis in FIG. 5 represents the energy of the characteristic X-rays. The vertical axis in FIG. 5 represents the transmittance of characteristic X-rays.

The solid lines 521 to 524 in FIG. 5 show the X-ray transmittance on a 10 mm optical path for a helium atmosphere of 101,325 Pa (1 atm), a first degree of vacuum atmosphere of 50 Pa, a second degree of vacuum atmosphere of 667 Pa, and a second degree of vacuum atmosphere of 1,200 Pa, respectively. The atmosphere of the first degree of vacuum or the atmosphere of the second degree of vacuum corresponding to the solid lines 522 to 524 was created by vacuuming the dry air. The temperature of each atmosphere is 20° C.

The dashed lines 531 to 538 in FIG. 5 show the energy values of the characteristic X-rays for light elements, respectively. Specifically, the dashed lines 531 to 538 correspond to the F—Kα line (0.687 keV), the Na—Kα line (1.041 keV), the Al—Kα line (1.560 keV), the Si—Kα line (1.840 keV), the P—Kα line (2.013 keV), the S—Kα line (2.307 keV) and the Cl—Kα line (2.621 keV), respectively.

FIG. 6 is a table showing the results of FIG. 5 in a tabular format. Specifically, FIG. 6 shows the ratio of the transmittance of each characteristic X-ray in each atmosphere and the ratio of (the transmittance of each characteristic X-ray in each such atmosphere)/(the transmittance of each characteristic X-ray in the helium atmosphere). Further, FIG. 6 includes the transmittance of each characteristic X-ray in an atmospheric atmosphere, which was not shown in FIG. 5.

Referring to FIG. 5 and FIG. 6, in the atmosphere of the first degree of vacuum of 50 Pa, the transmittance of characteristic X-rays for all light elements is 100% or greater with respect to the transmittance of a helium atmosphere. Further, in the atmosphere of the second degree of vacuum of 667 Pa, the characteristic X-rays for all light elements show a transmittance of 95% or more with respect to the transmittance of the helium atmosphere. In particular, except for F—Kα rays, for the characteristic X-rays with energies equal to or higher than that of Na—Kα rays, the transmittance of the helium atmosphere of 98% or higher is shown. Furthermore, in the atmosphere of the second degree of vacuum of 1,200 Pa, for F—Kα rays, the transmittance of about 87% with respect to the transmittance of the helium atmosphere is shown, but for characteristic X-rays with energies equal to or higher than that of Na—Kα rays, the transmittance of 95% or higher with respect to that of the helium atmosphere is shown.

In summary, in the atmosphere with the first degree of vacuum of 50 Pa, even the characteristic X-rays of fluorine (F), which has the lowest atomic number (lowest energy of characteristic X-rays and easily attenuated by the atmosphere) among the analysis target elements (elements that can be analyzed), can be analyzed with an intensity of 99% or higher. And even in the atmosphere with the second degree of vacuum of 667 Pa, it is possible to perform a light element analysis with an intensity of 95% or greater than that of a helium atmosphere. Even in the atmosphere with a second degree of vacuum of 1,200 Pa, which is even lower in the degree of vacuum, it is possible to analyze light elements with a molecular weight of Na or greater with the intensity of 95% or greater than that of a helium atmosphere.

Based on the analysis results shown in FIG. 5 and FIG. 6, the controller 1 sets the degree of vacuum in the sample chamber 8 and the measurement chamber 9 according to the analysis target element as well as the phase and the type of the sample. Specifically, for solid samples, the controller 1 sets the degree of vacuum in both the chambers to the first degree of vacuum of about 50 Pa. Further, for liquid samples, the controller 1 sets the degree of vacuum in both the chambers to a degree of vacuum with a high transmittance of the analysis target element within the range in which the liquid sample does not vaporize. At this time, the controller 1 sets the degree of cooling of the liquid sample so that the liquid sample does not vaporize when needed.

Next, the settings of the specific degree of vacuum or the specific degree of cooling in the analyzer 100 will be explained while referring to specific examples of liquid samples. Note that in this specification, "setting the degree of cooling" includes adjusting the degree of cooling to the same level as a predetermined set value. Note that the "set value" is not limited to a single predetermined value but may be a range with a predetermined upper limit and a predetermined lower limit. The "set value" may be defined, for example, as one predetermined value with a predetermined error range.

3-3. Liquid Sample in which Solvent is Water

Figure 7:
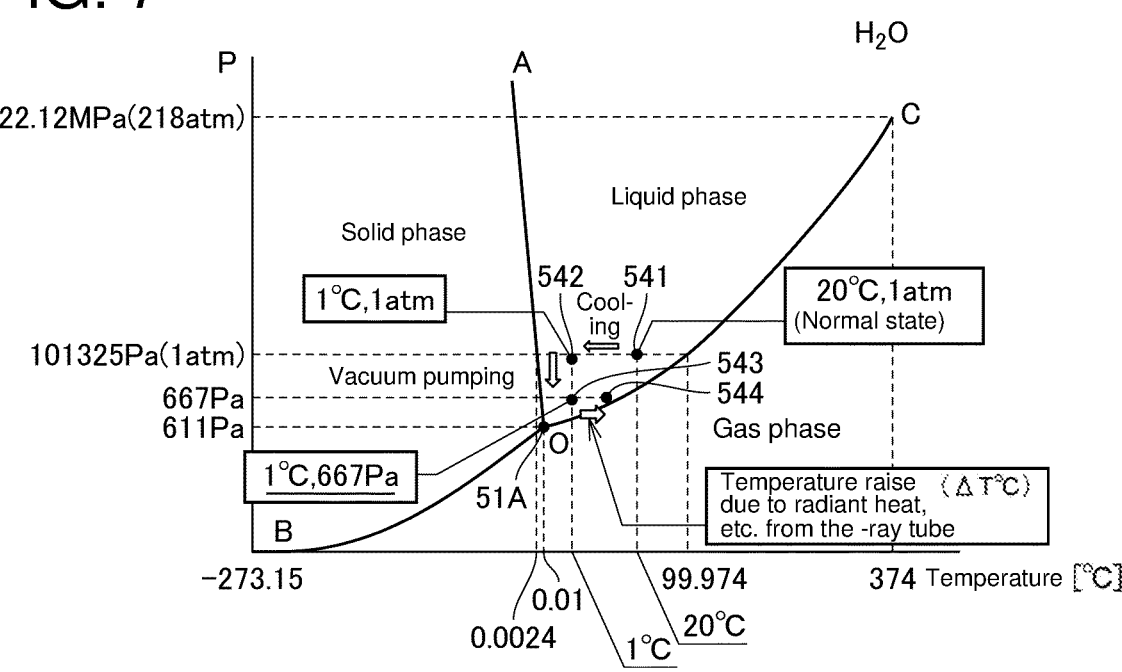
FIG. 7 is a diagram describing the settings of the degree of vacuum and the degree of cooling in a case where the solvent is water.

Next, the settings of the degree of vacuum and the degree of cooling for a liquid sample in which the solvent is water will be described with reference to FIG. 7. In FIG. 7, the changes in the degree of vacuum in the sample chamber 8 and the temperature of the sample are shown at points 541 to 544 on the phase change diagram of water. Note that the air pressure and the temperature corresponding to the triple point 51A of water are 611 Pa and 0.01° C., respectively.

The point 541 indicates the normal state of water. More specifically, it shows the water at room temperature (20° C.) and atmospheric pressure. When the degree of vacuum in the sample chamber 8 and the measurement chamber 9 is increased while the temperature remains at 20° C., the water vaporizes. As explained with reference to FIG. 5 and FIG. 6, the higher the degree of vacuum in the measurement chamber 9, the higher the transmittance of the X-rays. Therefore, it is preferable to increase the degree of vacuum in the sample chamber 8 and the measurement chamber 9 while keeping the sample in the liquid phase during the analysis. Therefore, in the case of analyzing a liquid sample in which water is a solvent, the degree of cooling of the sample and the degree of vacuum in both the chambers are preferably set such that the temperature of the sample and the air pressure in both the chambers are in the vicinity of the triple point 51A.

Hereinafter, the specific controls for cooling the sample and reducing the degree of vacuum in both the chambers in the analysis chamber 100 with the configuration described in FIG. 1 will be described. The analyzer 100 initially cools the sample to the state shown at the point 542 (1° C., 1 atm). Next, the analyzer 100 moves the sample to the analysis position AP. Next, the analyzer 100 raises the degree of vacuum in both the chambers to the state shown at the point 543 (1° C., 667 Pa) and starts the analysis of the sample.

Note that it is anticipated that the temperature of the sample during the analysis gradually increases due to the radiant heat from the X-ray tube 71 and other factors. Such a risk can be avoided by setting the degree of vacuum to be slightly higher in advance in anticipation of the margin for the temperature change, so that the sample does not cross the vapor pressure curve and enter the gas phase even if the temperature rises by ΔT° C. Further, as described with reference to FIG. 3, a configuration for cooling the sample during the analysis may be added. Further, in the analyzer 100, a thermally insulated structure may be provided to prevent the radiant heat from the X-ray tube 71 from being conducted to the sample.

As described above, in the case where the solvent is water, the analyzer 100 can set the degree of vacuum in the sample chamber 8 during the analysis of the sample to become lower than the triple point (611 Pa). With this, under the condition that the liquid sample in which water is a solvent is not vaporized, as shown in FIG. 6, it is possible to conduct a light element analysis with an intensity of 92% or higher for fluorine (F), and elements with atomic numbers equal to or higher than sodium (Na), as compared with a helium atmosphere.

Note that water is a typical solvent in a liquid sample to be analyzed in an X-ray fluorescence analyzer. Therefore, according to the analyzer 100 which can cool the sample to about 1° C. and set the degree of vacuum in the sample chamber 8 to be lower than 611 Pa, it is possible to perform a light element analysis with sufficient intensity without using helium and without vaporizing the liquid sample, for most liquid samples to be subjected to an X-ray fluorescent X-ray analysis.

3-4. Liquid Sample in which Solvent is Ethanol, Methanol, or Ether

In an X-ray fluorescence analysis, other than water, in some cases, ethanol, methanol, or ether is also used as a solvent. Next, the settings of the degree of vacuum and the degree of cooling when the solvent is ethanol, methanol, or ether will be described with reference to FIG. 8.

Figure 8:
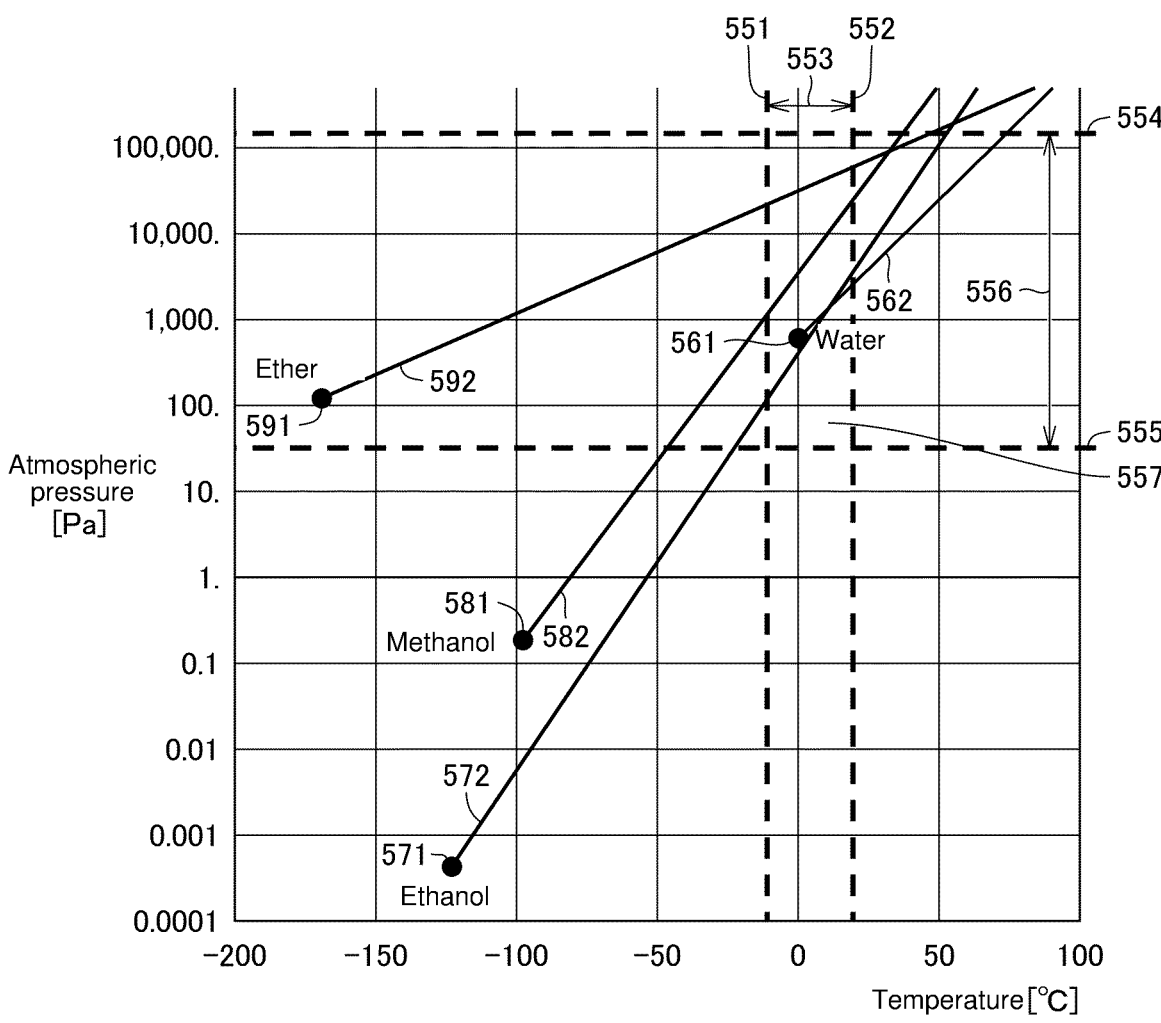
FIG. 8 is a diagram describing the triple point and the vapor pressure curve for each of water, ethanol, methanol, and ether.

FIG. 8 is a diagram describing the triple point and the vapor pressure curve for each of water, ethanol, methanol, and ether. The horizontal axis in FIG. 8 represents the temperature, and the vertical axis represents the atmospheric pressure. Further, FIG. 8 shows a straight line 552 indicating room temperature (20° C.) and a straight line 551 indicating −10° C. as the temperature set as the lower limit of the sample cooling. The range 553 between these two straight lines is the range of the sample temperatures that can be selected for this analysis. FIG. 8 also shows a straight line 554 indicating the atmospheric pressure (101,325 Pa) and a straight line 555 indicating the degree of vacuum of 50 Pa corresponding to the vacuum atmosphere of the first degree of vacuum used in the light element analysis of a solid sample. The range 556 between these two straight lines is the range of the degree of vacuum that can be selected for this analysis. In other words, the range 557 surrounded by these four straight lines is the selection range of the sample temperature and the degree of vacuum in the analysis.

The points 561, 571, 581, and 591 in FIG. 8 indicate the triple points of water, ethanol, methanol, and ether, respectively. The lines 562, 572, 582, and 592 show the images of the vapor pressure curves of water, ethanol, methanol, and ether, respectively.

The temperature and the pressure at the triple point of water are within the selection range 557 of the sample temperature and the degree of vacuum. Therefore, it is possible to select a point close to the triple point (the sample temperature and the degree of vacuum), which is the state in which an atmosphere of a higher degree of vacuum can be obtained while maintaining the liquid phase, in order to perform a light element analysis without attenuating the characteristic X-rays as much as possible.

On the other hand, the temperature of the triple point of ethanol and that of methanol are lower than the sample cooling lower limit, and the degree of vacuum of ethanol and that of methanol are higher than the first degree of vacuum. Further, for the ether triple point, the degree of vacuum is within the selection range 556 of the degree of vacuum, but the sample temperature is lower than the selection range 553 of the sample temperature.

Therefore, for solvents with triple points outside the selection range 557, as shown in the following FIG. 9, the analysis is performed within the selection range 557 and with the solvent kept in the liquid phase.

Figure 9:
FIG. 9 is a diagram describing the settings of the degree of vacuum and the degree of cooling in a case where the solvent is methanol.

FIG. 9 is an image diagram of the phase diagram of methanol. The horizontal axis in FIG. 9 represents the temperature, and the vertical axis represents the atmospheric pressure. The hatched region 61 is within the selection range 557 and is a region showing the combination of the degree of vacuum and the temperature in which the methanol remains in the liquid phase. The analyzer 100 controls the degree of cooling of the sample and the degree of vacuum in the sample chamber 8 so that the temperature of the sample and the degree of vacuum in the sample chamber 8 are included in the region 61. Further, as mentioned above, the higher the degree of vacuum, the higher the X-ray transmittance. Therefore, it is preferable that the analyzer 100 set the degree of vacuum in the measurement chamber 9 as high as possible while keeping the solvent in the liquid phase, within the adjustment range of the device.

Specifically, for example, the sample temperature is set to −9° C., and the degree of vacuum is set to 1,200 Pa (see FIG. 9, the point 60). This makes it possible to analyze the liquid sample in which methanol is a solvent with an intensity of 87% for fluorine (F), 96% for sodium (Na), and 97% for elements above magnesium (Mg) as compared with a helium atmosphere, without vaporizing the liquid sample (see FIG. 6).

3-5. Other Liquid Samples

The liquid sample for the analyzer 100 is not limited to the above-described examples. For example, it may be a liquid sample in which acetone is a solvent, or a liquid sample containing fats and oils. In the case where the triple point of the solvent is within the adjustment range of the analyzer 100, the analyzer 100 is preferably set such that the air pressure in the sample chamber 8 and the temperature of the liquid sample become close to the triple point. In the case where the triple point of the solvent is outside the adjustment range of the analyzer 100, the analyzer 100 preferably sets the degree of vacuum in the measurement chamber 9 as high as possible while the air pressure in the sample chamber 8 and the temperature of the liquid sample are within the adjustment range and while the liquid sample is kept in the liquid phase.

3-6. Flowchart

FIG. 10 is a flowchart describing the processing for setting the degree of vacuum in the sample chamber and the degree of cooling of the sample for a light element analysis.

In Step (hereinafter referred to as "S") 01, the controller 1 acquires the information about the sample. The information about the sample includes whether the sample is a liquid sample or a solid sample, and in the case where the sample is a liquid sample, the information also includes information about the type of solvent of the sample. In one example, the controller 1 receives the information about the sample input by the user using the input device 13. For example, in the case where the information about the sample is an "aqueous solution," or the "solvent is water," the information that the sample is a liquid sample and the information that the solvent is water are included. Further, for example, the information about the sample may be composed of a plurality of pieces of information, such as "liquid sample" and "solvent is water." The information about the sample may include the type of solute.

In S02, the controller 1 determines whether the sample is a liquid sample based on the information about the sample acquired in S01.

In the case where the sample is a liquid sample (YES in S02), in S03, the controller 1 determines the set value for the degree of vacuum in the sample chamber 8 and the set value for the degree of cooling of the sample, corresponding to the type of the solvent. The set value for the degree of cooling includes, for example, a cooling temperature and/or a cooling time.

In one example, the controller 1 is storing the information on the degree of vacuum in the sample chamber 8 and the degree of cooling of the sample, where the solvent of the sample is liquid, in its memory. One example of the information on the degree of vacuum in the sample chamber 8 and the degree of cooling of the sample is information, such as a phase diagram of the solvent, in which the set value for the vacuum in the sample chamber 8 and the set value for the degree of cooling of the sample can be calculated, where the solvent of the sample is liquid. Other examples of the information on the degree of vacuum in the sample chamber 8 and the degree of cooling of the sample are the set value itself for the degree of vacuum in the sample chamber 8 and the set value itself for the degree of cooling of the sample, where the solvent of the sample is liquid. Based on this information, the controller 1 then determines the set value for the degree of vacuum in the sample chamber 8 and the set value for the degree of cooling of the sample, where the solvent of the sample is liquid.

In another Example 1, the controller 1 may determine the set value for the degree of vacuum in the sample chamber 8 and the set value for the degree of cooling of the sample, where the solvent of the sample is liquid, using the information about the sample acquired from the communication interface, which is not shown.

In S04, the controller 1 sets the sample to the cooling mechanism 3. For example, the controller 1 sets the sample outside the analyzer 100 in the cooling mechanism 3 by means of a conveyance mechanism not shown. Note that the placement of the sample in the cooling mechanism 3 may be performed manually by the user.

In S05, the controller 1 cools the sample based on the set value for the degree of cooling. In other words, the controller 1 adjusts the degree of cooling of the sample to conform to its set value.

In S06, the controller 1 sets the cooled sample to the analysis position AP. The controller 1, for example, moves the sample to the analysis position AP after the sample has been cooled at a predetermined temperature for a predetermined time or longer in the cooling mechanism 3. And/or the analyzer 100 may be provided with a sensor to detect the temperature of the sample to be cooled in the cooling mechanism 3. In this case, the analyzer 100 may move the sample to the analysis position AP when it is determined that the cooling of the sample is completed based on the detection value of the sensor.

The controller 1 vacuums the measurement chamber 9 and the sample chamber 8 to a set value for the degree of vacuum. In other words, the controller 1 sets the degree of vacuum in the measurement chamber 9 and the sample chamber 8 to conform to the set values. Specifically, the controller 1 initially sets the vacuum adjustment mechanism 2 so that the degree of vacuum in the measurement chamber 9 and the sample chamber 8 during the analysis of the sample conform to the set value for the degree of vacuum, then performs vacuuming. Note that the set value for the degree of vacuum for the liquid sample in S07 is lower than the set value for the degree of vacuum for an individual sample, which is described later in S12.

In S08, the controller 1 analyzes the sample and then terminates the processing.

On the other hand, in the case where the sample is a solid sample (NO in S02), the controller 1 moves the sample to the analysis position AP in S11.

In S12, the controller 1 vacuums the measurement chamber 9 and the sample chamber 8 to the set value for the solid sample and then advances the processing to S8.

With the processing shown in FIG. 10, the analyzer 100 according to the embodiment allows the user to easily set the appropriate degree of vacuum in the sample chamber 8 and the degree of cooling of the sample, by simply inputting the information on the sample. Specifically, for a liquid sample, the controller 1 sets the degree of vacuum in the sample chamber 8 and the degree of cooling of the sample during the analysis of the sample so that the solvent is liquid, corresponding to the input type of the solvent. With this, it is possible to perform a light element analysis with sufficient intensity without using helium and vaporizing the liquid sample.

Note that in the case that the analysis target does not contain any light elements, the controller 1 can perform an analysis with the measurement chamber 9 and the sample chamber 8 kept in an atmospheric atmosphere and the sample temperature kept at room temperature.

4. Modifications

4-1. Modification 1

In the case where the user knows the set value for the degree of vacuum and the set value for the degree of cooling appropriate for the sample as the analysis target, the user may input the set value for the degree of vacuum and the set value for the degree of cooling, instead of inputting information about the sample as shown in S01 in FIG. 10.

Figure 11:
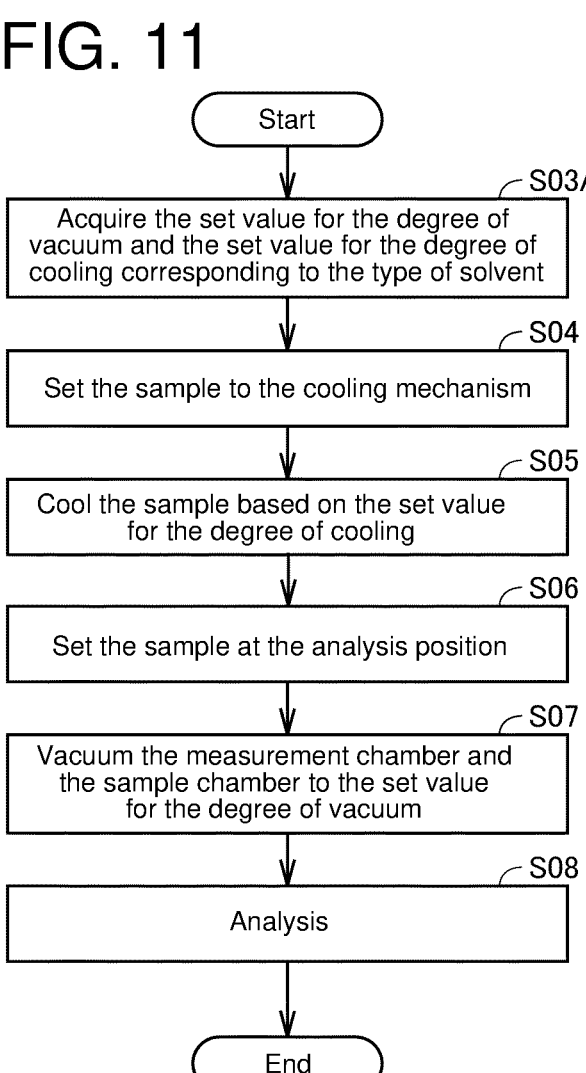
FIG. 11 is a flowchart describing the processing of setting the degree of vacuum and the degree of cooling according to Modification 1.

FIG. 11 is a flowchart describing the setting processing for the degree of vacuum in the sample chamber and the degree of cooling of the sample for the light element analysis, according to Modification 1.

In S03A of FIG. 11, the controller 1 acquires the set value for the degree of vacuum and the set value for the degree of cooling corresponding to the type of solvent. In one example, the controller 1 receives the set value for the degree of vacuum and the set value for the degree of cooling corresponding to the type of solvent, which were input by the user using the input device 13.

The processing of S04 to S08 in FIG. 11 is the same as that of S04 to S08 in FIG. 10.

By the processing shown in FIG. 11, the light element analysis can be performed with sufficient intensity, even without the memory 12 that stores "information on the degree of vacuum in the sample chamber and the degree of cooling of the sample, corresponding to the type of solvent, where the solvent is a liquid, or without using helium and without vaporizing the liquid sample. Note that even if the memory 12 is also provided and/or even if the function of acquiring the information from the outside is also provided, in the case where the user remembers the set values and it is rather faster to directly input the values, or in the case where it is desired to perform the analysis by temporarily changing the set values for some reasons, it is convenient that the set values can be manually input directly.

4-2. Modifications 2 to 5

In Modifications 2 to 5, in the same manner as the analyzer 100 according to the embodiment, the vacuum adjustment mechanism 2 and the cooling mechanism 3 are used to set the degree of vacuum in the sample chamber 8 and the degree of cooling of the sample S appropriately, so that the light element analysis with sufficient intensity can be performed without vaporizing the liquid sample. The variations of the configuration example of the analyzer will be shown.

Specifically, analyzers 100C to 100F according to the modifications may be dedicated machines for analyzing liquid samples of one type of solvent (e.g., water). As described above, a dedicated machine dedicated to handling a liquid sample as the analysis target has the advantage that the configuration and the control can be simplified as compared with an analyzer handling a plurality of types of liquid samples or an analyzer handling both a solid sample and a liquid sample.

Figure 12:
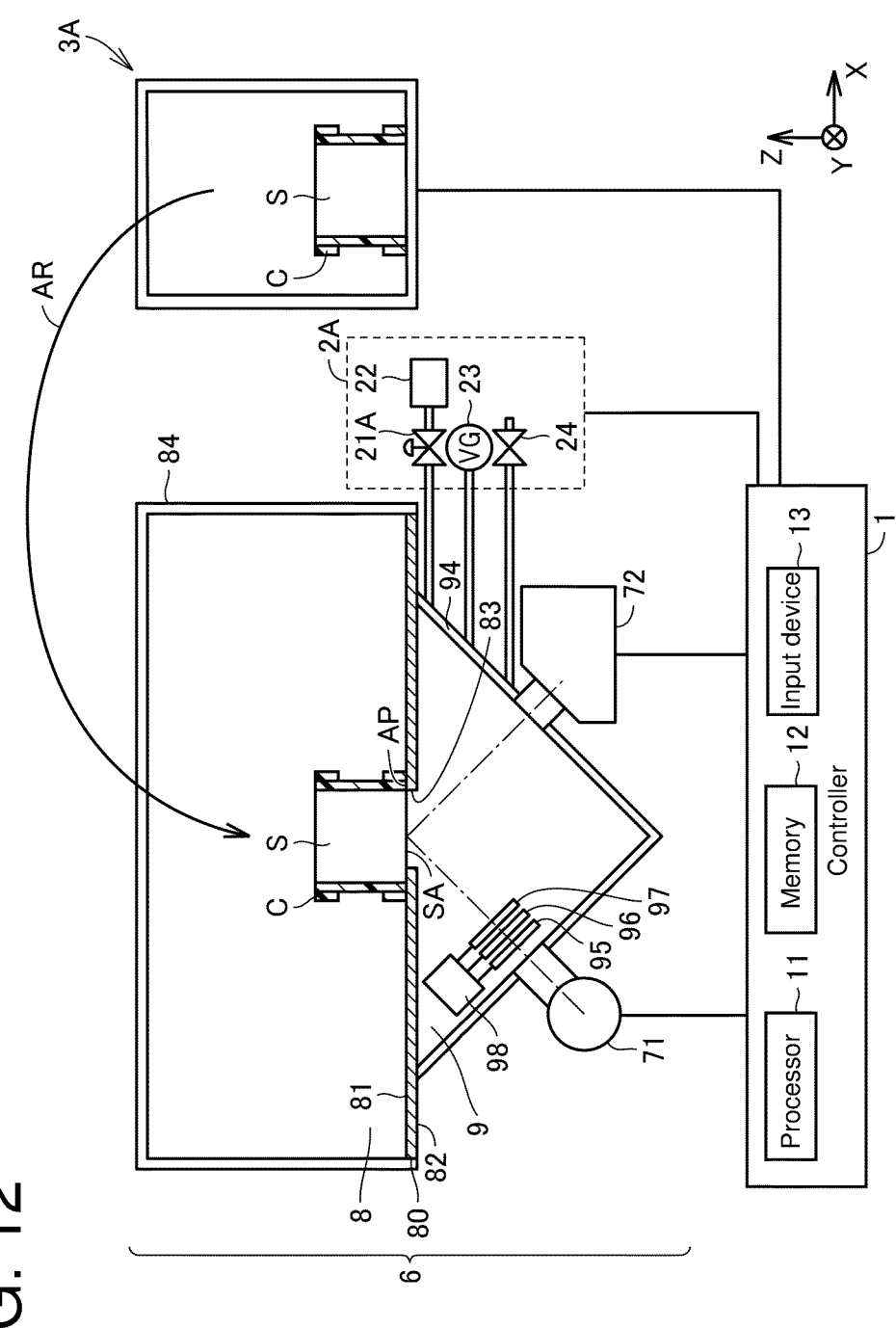
FIG. 12 is a schematic diagram showing one example of a configuration of an analyzer according to Modification 2.

For example, with reference to FIG. 12, in the analyzer 100C according to Modification 2, the conductance valve 21, whose open/close amount was controlled by the controller 1 in the analyzer 100 of FIG. 1, is replaced by a valve 21A, whose open/close amount is controlled manually. Further, in the analyzer 100C, a refrigerator 3A equipped with an ice greenhouse or a partial chamber is provided as a cooling mechanism.

In the analyzer 100C, the user can, for example, analyze a liquid sample as follows. Initially, the user manually moves the liquid sample, which has been cooled in the ice greenhouse or the partial chamber of the refrigerator 3A, to the analysis position AP (see arrow AR in FIG. 1) (see the arrow AR in FIG. 12). Then, the user adjusts the open/close amount of the valve 21A manually while monitoring the degree of vacuum with the vacuum gauge 23 to set the degree of vacuum in the sample chamber 8 and the degree of vacuum in the measurement chamber 9 to the vacuum level corresponding to the type of solvent of the liquid sample.

In particular, for a liquid sample in which the solvent is water, the user sets the opening and closing amount of the valve 21A so that the degree of vacuum in the sample chamber 8 and the measurement chamber 9 during the analysis of the sample is lower than 611 Pa. As long as the user analyzes samples of the same solvent, there is no need to re-set the position of the valve 21A once set, so there is no need to use the conductance valve 21, which is controlled by the controller 1, in a dedicated machine. This simplifies the configuration of the analyzer and the control of the adjustment of the degree of vacuum.

Next, analyzers 100D to 100F according to Modifications 3 to 5 will be described, focusing on the portions changed from the analyzer 100C according to Modification 2.

Figure 13:
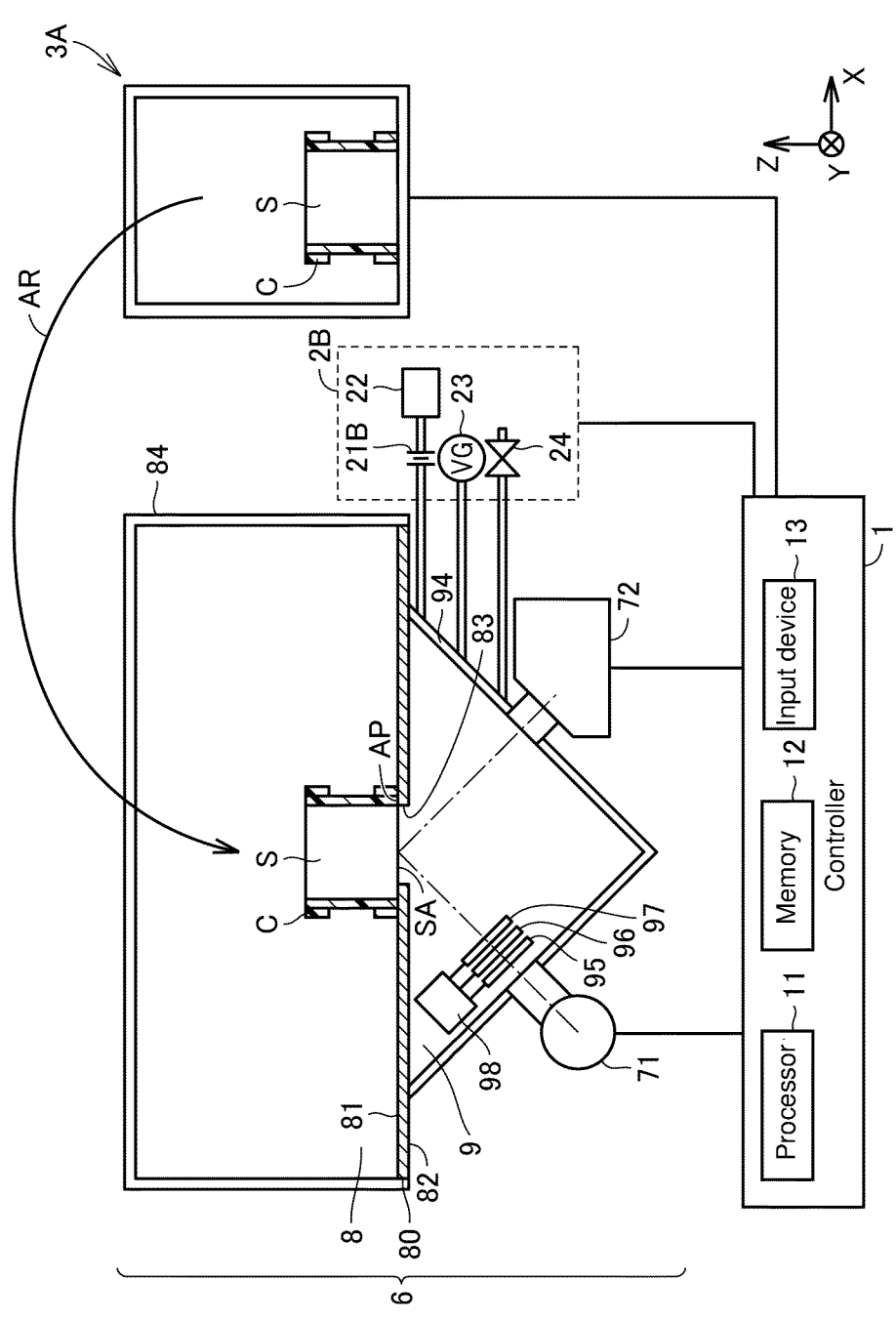
FIG. 13 is a schematic diagram showing one example of a configuration of an analyzer according to Modification 3.

Referring to FIG. 13, in the analyzer 100D according to Modification 3, an orifice 21B with a conductance set to achieve the degree of vacuum suitable for a given solvent is installed in place of the valve 21A. In this case, the user can set the degree of vacuum in the sample chamber 8 and the measurement chamber 9 to be suitable for the solvent of the sample as an analysis target by simply vacuuming through the orifice 21B, without the need to adjust the degree of opening and closing of the valve 21A. In other words, the vacuum adjustment mechanism 2 is pre-set to enable appropriate vacuuming to be performed according to the specifications of the orifice 21B. With this, the configuration of the analyzer and the control of the vacuum degree adjustment can be further simplified.

Figure 14:
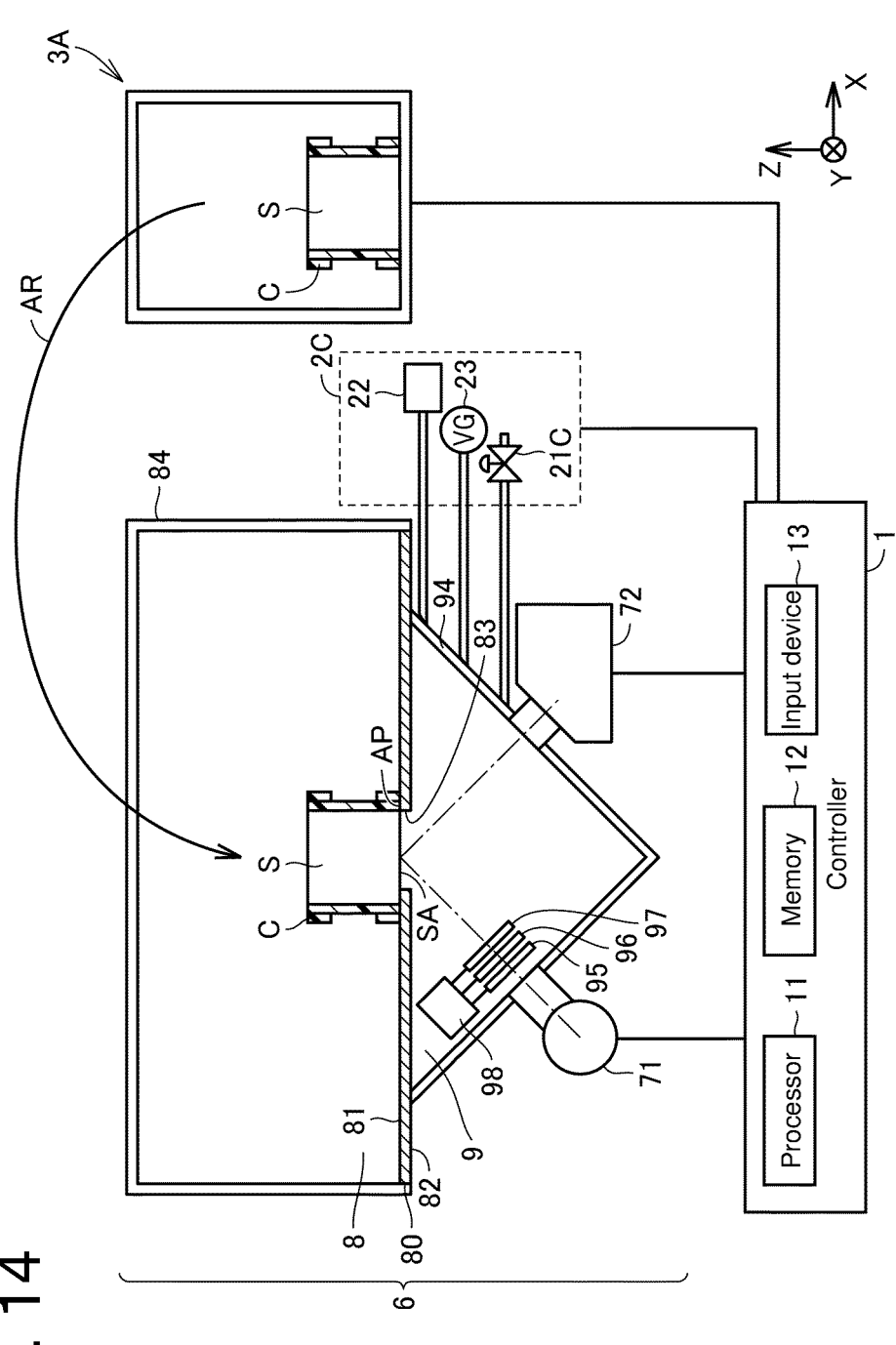
FIG. 14 is a schematic diagram showing one example of a configuration of an analyzer according to Modification 4.

Referring to FIG. 14, in the analyzer 100E according to Modification 4, the valve 21A, which is a variable valve, is removed, and instead, the valve 24 is replaced by the valve 21C which is a variable valve. In the analysis device 100E, the degree of vacuum in the measurement chamber 9 and the sample chamber 8 can be set to the first degree of vacuum by exhausting from the pump 22 with the valve 21C completely closed. On the other hand, by adjusting the ratio of the amount of intake air from the valve 21C to the amount of exhaust air from the pump 22 which is proportional to the opening of the valve 21C, the degree of vacuum in the measurement chamber 9 and the sample chamber 8 can be set to the second vacuum degree.

Specifically, the atmosphere of the second degree of vacuum is produced as follows. The user initially starts exhausting from the pump 22 with the valve 21C fully opened. Thereafter, the user closes the valve 21C little by little while checking the value of the vacuum gauge 23. The user then fixes the opening/closing degree of the valve 21C when the vacuum gauge 23 indicates the desired degree of vacuum (e.g., 667 Pa or 1,200 Pa). With this, the degree of vacuum in the measurement chamber 9 and the sample chamber 8 are set to the desired value.

Figure 15:
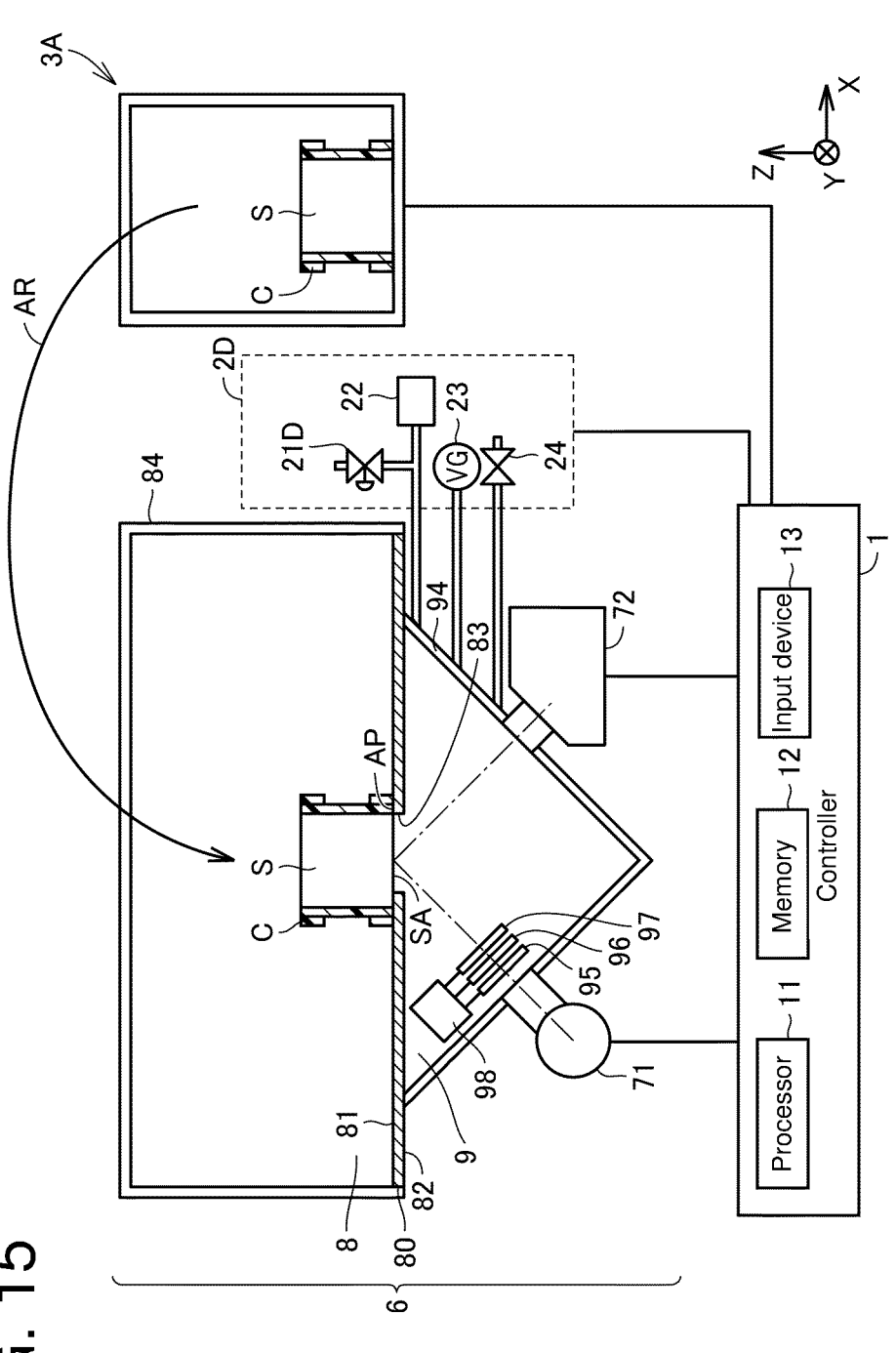
FIG. 15 is a schematic diagram showing one example of a configuration of an analyzer according to Modification 5.

Referring to FIG. 15, in the analyzer 100F according to Modification 5, the valve 21A provided between the measurement chamber 9 and the pump 22 is deleted, and instead, the piping branching off from the piping between the measurement chamber 9 and the pump 22 is provided, and a valve 21D is provided to the piping. The valve 21D is a variable valve, similar to the valve 21A. In the analysis device 100F, in the same manner that the degree of vacuum in the measurement chamber 9 and the sample chamber 8 was set to the second degree of vacuum using the valve 21C in the analysis device 100E, the degree of vacuum in the measurement chamber 9 and the sample chamber 8 can be set to the second degree of vacuum using the valve 21D.

Specifically, the user initially starts exhausting from the pump 22 with the valve 21D fully opened. Thereafter, the user closes the valve 21D little by little while checking the value of the vacuum gauge 23. The user then fixes the opening and closing degree of the valve 21D when the vacuum gauge 23 indicates a desired degree of vacuum.

Note that the analyzers 100C, 100E, and 100F shown in FIG. 12, FIG. 14, and FIG. 15, respectively allow the user to manually adjust the opening and closing amount of the valves 21A, 21C, and 21D to set a degree of vacuum in three or more steps, or steplessly. Therefore, to the extent that the performance of the valves 21A, 21C, 21D, etc., permits, it is possible to divert the sample to the analysis of liquid samples in other solvents or the analysis of solid samples. On the other hand, in the analyzer 100D shown in FIG. 13, only two degrees of vacuum can be set: atmospheric pressure and the degree of vacuum corresponding to the analysis of a given solvent. However, it is superior in that it eliminates the need to adjust the degree of vacuum.

As described above, in the analyzers 100C to 100F in which liquid samples are analysis targets, the vacuum adjustment mechanism 2 is set so that the degree of vacuum in the sample chamber 8 during the analysis of a liquid sample corresponds to the type of solvent in the liquid sample. For example, in the case where the analyzers 100C to 100F are dedicated machines for analyzing liquid samples in which water is a solvent, the vacuum adjustment mechanisms 2A to 2D are set such that the degree of vacuum in the sample chamber 8 is lower than 611 Pa during the analysis of the liquid sample. This allows a light element analysis with sufficient intensity without using helium and without vaporizing the liquid sample, using the vacuum adjustment mechanism with a simple structure.

Note that in Modifications 2 to 5, analyzers dedicated to analyzing liquid samples of one type of solvent are mainly described, but "analyzers dedicated to analyzing multiple types of liquid samples, but not for analyzing solid samples" can also be configured with the aid of the description of this embodiment or Modifications and included within the scope of this embodiment or Modifications.

Aspects

It would be understood by those skilled in the art that the exemplary embodiments described above are specific examples of the following aspects.

Item 1

An energy dispersive X-ray fluorescence analyzer according to one aspect of the present disclosure is an energy dispersive X-ray fluorescence analyzer for analyzing a sample. The X-ray fluorescence analyzer is provided with a sample stage, a first housing, an X-ray tube, a detector, and a vacuum adjustment mechanism. The sample stage is configured to place the sample thereon. The first housing is mounted on a first face of the sample stage, the sample being placed on the first face, the first housing forming a sample chamber together with the sample stage. The detector is configured to detect fluorescent X-rays emitted from the sample when the sample in the sample chamber is irradiated with primary X-rays emitted from the X-ray tube. The vacuum adjustment mechanism is configured to set the degree of vacuum in the sample chamber. In a case where the sample is liquid, the vacuum adjustment mechanism sets the degree of vacuum in the sample chamber during the analysis of the sample to be lower than in a case where the sample is a solid sample.

According to the X-ray fluorescence analyzer as recited in the above-described Item 1, a light element analysis with sufficient intensity can be performed without using helium and without vaporizing a liquid sample.

Item 2

The X-ray fluorescence analyzer as recited in the above-described Item 1 further includes a controller configured to control the vacuum adjustment mechanism. In a case where the sample is liquid, the vacuum adjustment mechanism sets the degree of vacuum in the sample chamber during the analysis of the sample to be lower than in a case where the sample is a solid sample.

According to the X-ray fluorescence analyzer described in the above-described Item 2, the vacuum adjustment mechanism can be controlled and set by the controller. Thus, the user can reduce the burden of manually controlling and setting the vacuum adjustment mechanism.

Item 3

The X-ray fluorescence analyzer as recited in the above-described Item 1, further includes a second housing mounted on a second face of the sample stage on a side facing the first face, the second housing forming a measurement chamber together with the sample stage. The X-ray tube and the detector are provided on the measurement chamber, and the vacuum adjustment mechanism performs vacuuming so that a degree of vacuum in the sample chamber and a degree of vacuum in the measurement chamber are equalized during the analysis of the sample.

According to the X-ray fluorescence analyzer described in the above-described Item 3, it is possible to prevent that the difference in the degree of vacuum between the measurement chamber and the sample chamber causes the film to deflect.

Item 4

In the X-ray fluorescence analyzer as recited in the above-described Item 2 or 3, the controller adjusts the degree of vacuum in the sample chamber during the analysis of the sample in three or more steps, or steplessly.

According to the X-ray fluorescence analyzer as recited in the above-described Item 4, a light element analysis with sufficient intensity can be performed without using helium and without vaporizing a liquid sample.

Item 5

In the X-ray fluorescence analyzer as recited in any one of the above-described Items 2 to 4, in the case where the sample is liquid, the controller sets the degree of vacuum in the sample chamber during the analysis of the sample so as to correspond to a type of solvent of the sample.

According to the X-ray fluorescence analyzer as recited in the above-described Item 5, it is possible to analyze a liquid sample in a state in which the solvent does not evaporate.

Item 6

In the X-ray fluorescence analyzer as recited in the above-described Item 5, the controller includes an input device capable of inputting a set value for the degree of vacuum in the sample chamber, and the controller sets the degree of vacuum in the sample chamber during the analysis of the sample based on the set value for the degree of vacuum.

According to the X-ray fluorescence analyzer as recited in the above-described Item 6, the light element analysis with sufficient intensity can be performed, even without the memory that stores "information on the degree of vacuum in the sample chamber and the degree of cooling of the sample, corresponding to the type of solvent, where the solvent is a liquid, or without the use of helium and without acquiring such information externally, or without vaporizing the liquid sample. It is also useful when it is desired to change the set value in some state and analyze them.

Item 7

In the X-ray fluorescence analyzer as recited in the above-described Item 5 or 6, the controller is equipped with an input device capable of inputting the type of solvent, and the controller sets the degree of vacuum in the sample chamber during the analysis of the sample so as to correspond to the type of solvent input by the input device so that the solvent is liquid.

With the X-ray fluorescence analyzer as recited in the above-described Item 7, it is possible for the user to easily set the appropriate degree of vacuum in the sample chamber simply by inputting the type of solvent.

Item 8

In the X-ray fluorescence analyzer as recited in any one of the above-described Items 5 to 7, in a case where the solvent is water, the controller sets the degree of vacuum in the sample chamber during the analysis of the sample to be lower than 611 Pa.

Note that water is a typical solvent in a liquid sample to be analyzed in an X-ray fluorescence analyzer. Therefore, according to the X-ray fluorescence analyzer as recited in the above-described Item 8, it is possible to perform a light element analysis with sufficient intensity without using helium and without vaporizing the liquid sample, for most liquid samples targeted for an X-ray fluorescent analysis.

Item 9

In the X-ray fluorescence analyzer as recited in any one of the above-described Items 1 to 8, it is further provided with a cooling mechanism configured to cool the sample.

According to the X-ray fluorescence analyzer as recited in the above-described Item 9, it is possible to maintain the temperature of the sample during the analysis within the temperature range in which the sample does not vaporize even at the atmospheric pressure in the sample chamber.

Item 10

In the X-ray fluorescence analyzer as recited in the above-described Item 9, the cooling mechanism is positioned away from the analysis position where the sample is positioned during the analysis of the sample. The controller moves the sample cooled by the cooling mechanism to the analysis position and then analyzes the sample.

According to the X-ray fluorescence X-ray analyzer as recited in the above-described Item 10, the sample can be cooled before the analysis. With this, it is possible to adjust the temperature of the sample to remain within a range not exceeding the vapor-liquid equilibrium line even if the temperature rises during the analysis by cooling the sample sufficiently prior to the analysis.

Item 11

In the X-ray fluorescence analyzer as recited in the above-described Item 9 or 10, the cooling mechanism is positioned adjacent to an analysis position at which the sample is positioned during the analysis of the sample, and the controller cools the sample during the analysis by the cooling mechanism.

According to the X-ray fluorescence analyzer as recited in the above-described Item 11, the sample during the analysis can be kept within the desired temperature range by directly cooling the sample.

Item 12

In the X-ray fluorescence analyzer as recited in any one of the above-described Items 9 to 11, in a case where the sample is liquid, the controller sets the degree of cooling of the sample so as to correspond to the type of solvent of the sample.

According to the X-ray fluorescence analyzer as recited in the above-described Item 12, it is possible to analyze a liquid sample in a state in which the solvent does not evaporate.

Item 13

In the X-ray fluorescence analyzer as recited in the above-described Item 12, the controller includes an input device capable of inputting a set value for the degree of vacuum in the sample chamber and a set value for the degree of cooling of the sample. The controller sets the degree of vacuum in the sample chamber and the degree of cooling of the sample during the analysis of the sample so that the solvent is liquid, based on the set value for the degree of vacuum in the sample chamber and the set value for the degree of cooling of the sample.

According to the X-ray fluorescence analyzer as recited in the above-described Item 13, even without a memory that stores "information on the degree of vacuum in the sample chamber and the degree of cooling of the sample, corresponding to the type of solvent, where the solvent is liquid," and even without acquiring such information from an external source, it is possible to perform a light element analysis without using helium or vaporizing a liquid sample and with sufficient intensity. It is also useful when it is desired to change the set value in some state and analyze them.

Item 14

In the X-ray fluorescence analyzer as recited in the above-described Item 12 or 13, the controller includes an input device capable of inputting the type of solvent. The controller sets the degree of vacuum in the sample chamber and the degree of cooling of the sample during the analysis of the sample so as to correspond to the type of solvent input by the input device so that the solvent is liquid.

According to the X-ray fluorescence analyzer as recited in the above-described Item 14, it is possible for the user to easily set the appropriate degree of vacuum in the sample chamber and the degree of cooling of the sample by simply inputting the type of solvent.

Item 15

In the X-ray fluorescence analyzer as recited in the above-described item 14, the controller further includes a memory for storing information on the degree of vacuum in the sample chamber and the degree of cooling of the sample corresponding to the type of solvent, the solvent being liquid. The the controller sets the degree of vacuum in the sample chamber and the degree of cooling of the sample during the analysis of the sample so that the solvent is liquid, based on the information.

According to the X-ray fluorescence analyzer as recited in the above-described Item 15, it is possible to determine the set value for the degree of vacuum and the set value for the degree of cooling of the sample chamber 8 using reliable information stored in the apparatus and in a simplified manner.

Item 16

In the X-ray fluorescence analyzer as recited in any one of the above-described Items 1 to 15, the sample is a liquid sample. The vacuum adjustment mechanism sets the degree of vacuum in the sample chamber during the analysis of the sample to a degree of vacuum corresponding to the type of solvent of the sample.

According to the X-ray fluorescence analyzer as recited in the above-described Item 16, it is possible to perform a light element analysis with sufficient intensity without using helium and without vaporizing a liquid sample, using the vacuum adjustment mechanism of a simple constituent mechanism.

Item 17

In the X-ray fluorescence analyzer as recited in any one of the above-described Items 1 to 16, the sample is a liquid sample, solvent of the sample being water. The vacuum adjustment mechanism sets the degree of vacuum in the sample chamber during the analysis of the sample to be lower than 611 Pa.

According to the X-ray fluorescence analyzer as recited in the above-described Item 17, it is possible to perform a light element analysis with sufficient intensity without using helium and without vaporizing a liquid sample, using the vacuum adjustment mechanism of a simple structure.

While illustrative embodiments of the present disclosure have been described herein, the present disclosure is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. An energy dispersive X-ray fluorescence analyzer for analyzing a sample, comprising:
   a sample stage configured to place the sample thereon;
   a first housing mounted on a first face of the sample stage, the sample being placed on the first face, the first housing forming a sample chamber together with the sample stage;
   an X-ray tube;
   a detector configured to detect fluorescent X-rays emitted from the sample when the sample in the sample chamber is irradiated with primary X-rays emitted from the X-ray tube; and
   a vacuum adjuster comprising a pump, a valve and a vacuum gauge, the vacuum adjuster being configured to set a degree of vacuum in the sample chamber,
   wherein the vacuum adjuster is configured to set the degree of vacuum in the sample chamber during analysis of the sample to be a lower degree of vacuum when the sample is liquid than a degree of vacuum when the sample is solid,
   further comprising a controller configured to control the vacuum adjuster,
   wherein the controller is configured to set the degree of vacuum in the sample chamber during the analysis of the sample to be a lower degree of vacuum when the sample is liquid than a degree of vacuum when the sample is solid, and
   wherein when the sample is liquid including a solvent, the controller is configured to set the degree of vacuum in the sample chamber during the analysis of the sample so as to correspond to a type of solvent of the sample.

2. The X-ray fluorescence analyzer as recited in claim 1, further comprising:
   a second housing mounted on a second face of the sample stage on a side facing the first face, the second housing forming a measurement chamber together with the sample stage,
   wherein the X-ray tube and the detector are provided on the measurement chamber, and
   wherein the vacuum adjuster is configured to perform vacuuming so that a degree of vacuum in the sample chamber and a degree of vacuum in the measurement chamber are equalized during the analysis of the sample.

3. The X-ray fluorescence analyzer as recited in claim 1, wherein the controller is configured to adjust the degree of vacuum in the sample chamber during the analysis of the sample in three or more steps, or steplessly.

4. The X-ray fluorescence analyzer as recited in claim 1, wherein the controller includes an input device capable of inputting a set value for the degree of vacuum in the sample chamber, and
   wherein the controller is configured to set the degree of vacuum in the sample chamber during the analysis of the sample based on the set value for the degree of vacuum.

5. The X-ray fluorescence analyzer as recited in claim 1, wherein the controller is equipped with an input device capable of inputting the type of solvent, and
   wherein the controller is configured to set the degree of vacuum in the sample chamber during the analysis of the sample so as to correspond to the type of solvent input by the input device so that the solvent is liquid.

6. The X-ray fluorescence analyzer as recited in claim 1, wherein the controller is configured to set sets the degree of vacuum in the sample chamber during the analysis of the sample to be lower than 611 Pa when the solvent is water.

7. The X-ray fluorescence analyzer as recited in claim 1, wherein the sample is a liquid sample, and
   wherein the vacuum adjuster is configured to set the degree of vacuum in the sample chamber during the analysis of the sample to a degree of vacuum corresponding to the type of solvent of the sample.

8. The X-ray fluorescence analyzer as recited in claim 1, wherein the sample is a liquid sample, solvent of the sample being water, and
   wherein the vacuum adjuster adjustment mechanism is configured to set sets the degree of vacuum in the sample chamber during the analysis of the sample to be lower than 611 Pa.

9. An energy dispersive The X-ray fluorescence analyzer for analyzing a sample, comprising:
   a sample stage configured to place the sample thereon;
   a first housing mounted on a first face of the sample stage, the sample being placed on the first face, the first housing forming a sample chamber together with the sample stage;
   an X-ray tube;
   a detector configured to detect fluorescent X-rays emitted from the sample when the sample in the sample chamber is irradiated with primary X-rays emitted from the X-ray tube;
   a vacuum adjuster comprising a pump, a valve and a vacuum gauge, the vacuum adjuster being configured to set a degree of vacuum in the sample chamber, and a cooler configured to cool the sample, wherein the vacuum adjuster is configured to set the degree of vacuum in the sample chamber during analysis of the sample to be a lower degree of vacuum when the sample is liquid than in a degree of vacuum when the sample is solid.

10. The X-ray fluorescence analyzer as recited in claim 9, further comprising a controller configured to control the vacuum adjuster, and a moving mechanism comprising an X-axis rail, a Y-axis rail, a Z-axis rail, a moving body, an arm and a gripper, wherein the cooler is positioned away from an analysis position where the sample is positioned during the analysis of the sample, and wherein the controller is configured to move the sample cooled by the cooler by the moving mechanism, to the analysis position and then analyzes the sample.

11. The X-ray fluorescence analyzer as recited in claim 9, further comprising a controller configured to control the vacuum adjuster;

wherein the cooler is positioned adjacent to an analysis position at which the sample is positioned during the analysis of the sample, and wherein the controller is configured to cool the sample during the analysis by the cooler.

12. The X-ray fluorescence analyzer as recited in claim 9, further comprising a controller configured to control the vacuum adjuster;

wherein the controller is configured to set the degree of cooling of the sample so as to correspond to a type of solvent of the sample, when the sample is liquid.

13. The X-ray fluorescence analyzer as recited in claim 12, wherein the controller includes an input device capable of inputting a set value for the degree of vacuum in the sample chamber and a set value for the degree of cooling of the sample, and wherein the controller is configured to set the degree of vacuum in the sample chamber and the degree of cooling of the sample during the analysis of the sample so that the solvent is liquid, based on the set value for the degree of vacuum in the sample chamber and the set value for the degree of cooling of the sample.

14. The X-ray fluorescence analyzer as recited in claim 12, wherein the controller includes an input device capable of inputting the type of solvent, and wherein the controller is configured to set the degree of vacuum in the sample chamber and the degree of cooling of the sample during the analysis of the sample so as to correspond to the type of solvent input by the input device so that the solvent is liquid.

15. The X-ray fluorescence analyzer as recited in claim 14, wherein the controller further includes a memory for storing information on the degree of vacuum in the sample chamber and the degree of cooling of the sample corresponding to the type of solvent, the solvent being liquid, and wherein the controller is configured to set the degree of vacuum in the sample chamber and the degree of cooling of the sample during the analysis of the sample so that the solvent is liquid, based on the information.

* * * * *